United States Patent
Kasumi et al.

[19]

[11] Patent Number: 5,869,962
[45] Date of Patent: Feb. 9, 1999

[54] MAGNETIC DETECTION APPARATUS FOR DETECTING MOVEMENT OF AN OBJECT HAVING A NONUNIFORM SYSTEM OF TEETH

[75] Inventors: Shigehiro Kasumi, Kariya; Tatsuo Tamura, Kuwana; Kenji Yagi, Chiryu; Ichirou Izawa, Okazaki, all of Japan

[73] Assignee: Nippondenso Co., Ltd., Kariya, Japan

[21] Appl. No.: 628,090

[22] Filed: Apr. 9, 1996

[30] Foreign Application Priority Data

Apr. 11, 1995 [JP] Japan .................................. 7-085741
Jul. 6, 1995 [JP] Japan .................................. 7-171204

[51] Int. Cl.$^6$ .......................... G01B 7/30; G01R 33/06; H01L 43/08
[52] U.S. Cl. ............................. 324/207.21; 324/207.2; 324/207.25
[58] Field of Search .................... 324/207.11–207.25, 324/207.26, 252, 260, 160–174; 338/32 R, 32 H; 310/168; 340/669–672, 686, 870.31, 870.35, 870.36; 361/236; 33/1 PT; 341/15; 123/414

[56] References Cited

U.S. PATENT DOCUMENTS

| 3,930,201 | 12/1975 | Ackermann et al. | 324/207.25 |
| 4,072,893 | 2/1978 | Huwyler | 324/207.25 |
| 4,528,471 | 7/1985 | Baumann | 310/11 |
| 5,430,370 | 7/1995 | Rooke | 324/207.25 |
| 5,493,219 | 2/1996 | Makino et al. | 324/207.25 |
| 5,729,127 | 3/1998 | Tamura et al. | 324/207.21 |

FOREIGN PATENT DOCUMENTS

| 621 460 | 10/1994 | European Pat. Off. . |
| 54-077149 | 6/1979 | Japan . |
| 55-058402 | 5/1980 | Japan . |
| 61-147108 | 7/1986 | Japan . |
| 64-016919 | 1/1989 | Japan . |
| 3-195970 | 8/1991 | Japan . |
| 6-033419 | 8/1994 | Japan . |

*Primary Examiner*—Jay M. Patidar
*Attorney, Agent, or Firm*—Cushman Darby & Cushman IP Group of Pillsbury Madison & Sutro LLP

[57] ABSTRACT

A magnetic detection apparatus detects movement of an object having a nonuniform system of teeth by means of magneto-electric conversion devices, wherein technical problems such as too large an amplified output signal, a nonuniform pulse period and a complicated circuit configuration can be solved. A plurality of uniform triangular teeth are formed on the circumference of a gear at equal angular intervals, and in a predetermined region a trapezoidal tooth is formed, where the height of the trapezoidal tooth is smaller than the height of the uniform teeth but greater than half their height. The magnetized surface of a bias magnet facing the gear generates a bias magnetic field directed toward the gear. Magneto-resistive devices are provided in the bias magnetic field. Variations in state of the bias magnetic field generated by the bias magnetic magnet when the gear is rotated are converted into an output electrical signal by the magneto-resistive devices. A binary conversion circuit converts the electrical signal output into a binary signal. Receiving the binary signal, a processing circuit detects a reference position and the rotational direction of the object.

20 Claims, 19 Drawing Sheets

$\frac{1}{2}H_1 < H_2 < H_1$

GEAR CENTER

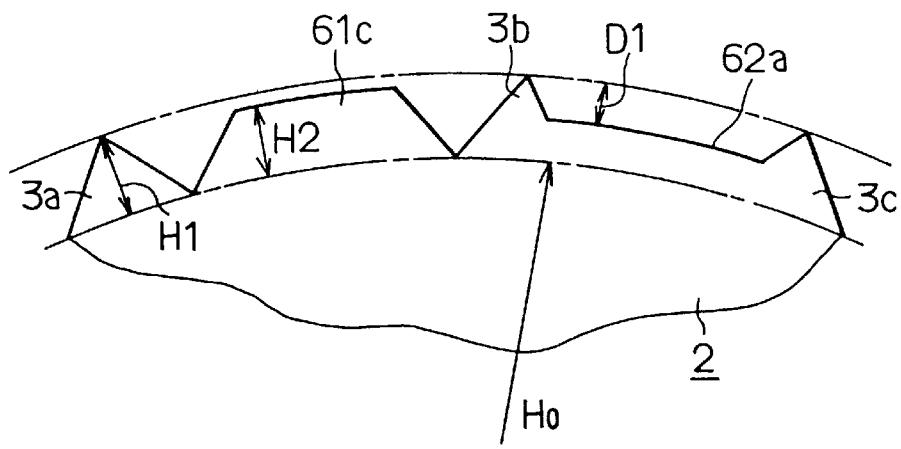
FIG. 32   H2=0.6~0.9·H1
D1=0.4~0.6·H1
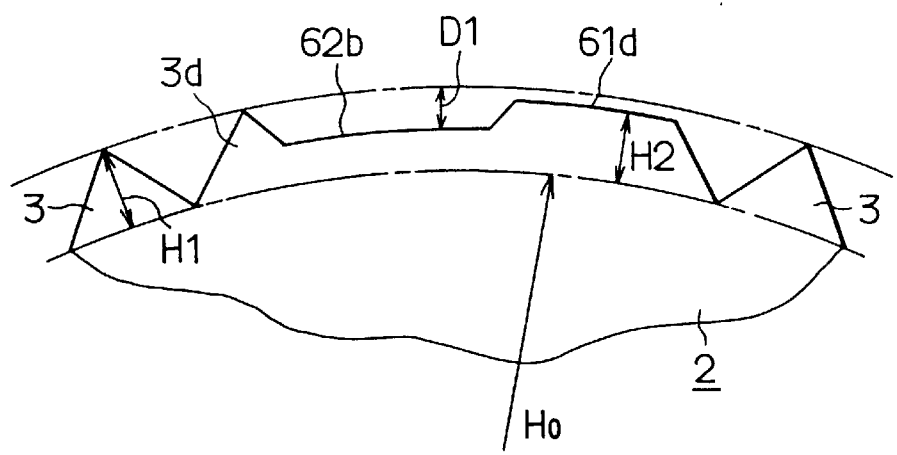
FIG. 33   H2=0.6~0.9·H1
D1=0.4~0.6·H1
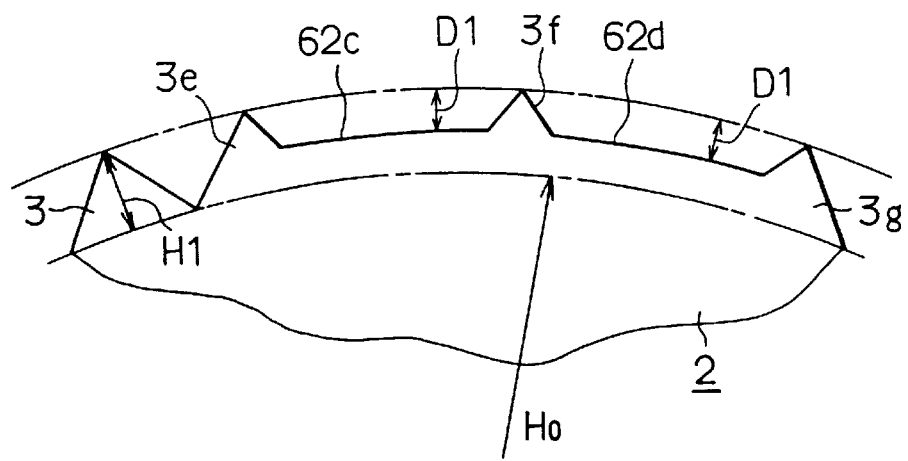
FIG. 34   D1=0.4~0.6·H1

MAGNETIC DETECTION APPARATUS FOR DETECTING MOVEMENT OF AN OBJECT HAVING A NONUNIFORM SYSTEM OF TEETH

BACKGROUND OF THE INVENTION

1. Field of the Invention

The present invention relates to a magnetic detection apparatus for detecting the movement of an object by means of a magneto-electric conversion device which utilizes the current magnetic-effect of a magneto-resistive device, a Hall device or the like.

2. Description of Related Art

A conventional rotation detecting apparatus for detecting the movement of an object by using a magneto-electric conversion device is known by, for instance, JP-A 3-195970. In this apparatus, magneto-electric devices are provided in such a way that each of them faces gear teeth through an air gap. Variations in bias magnetic field generated by a bias magnet which variations are caused by the rotation of the gear and are converted by the magneto-electric device into an output electrical signal. The output electrical signal is then converted into binary data. By counting the number of pulses of the binary data or measuring the gap between two consecutive pulses or the pulse period, the rotational angle and the rotational speed can be found. As an apparatus of this type, a determination as to whether or not the rotation is in the opposite direction can also be made as is disclosed in JP-Y2 6-33419. In this apparatus, two component pairs each comprising a magneto-resistive device and a circuit for converting a signal output by the magneto-resistive device into binary data are provided. The binary data output by the circuit is used for determining whether the direction of the rotation is normal or reverse.

In several experiments conducted by the inventors, an attempt was made to detect a reference position by eliminating a tooth of the gear at the reference position. With a tooth eliminated, the gap between two consecutive pulses is changed and the change in pulse gap (or pulse period) can be observed as the reference position. However, the inventors were aware of the fact that the amplitude of an alternating current signal output by the magneto-resistive device on the boundary between a region with teeth arranged continuously and a location with a missing tooth for detecting the reference position inevitably increased. As a result, a problem was encountered when the alternating current signal output by the magneto-resistive device was amplified in preprocessing prior to the conversion process into binary data. On the boundary between the region with teeth arranged continuously and the location with a missing tooth, the pulse gap for detecting the reference position is found to be greater than the pulse gap (or the pulse period) in the region with teeth arranged continuously after the binary conversion, making it impossible to pass on accurate rotation angle information after the binary conversion. In order to determine whether or not the rotation is in the reverse direction, it is necessary to provide two component pairs each comprising a magneto-resistive device and a circuit for converting a signal output by the magneto-resistive device into binary data as described above, making the configuration of the circuit complex.

In the detection of the rotation of an object of observation by means of a magnetic pickup, the output voltage V is equal to $d\Phi/dt$. As a result, the magnitude of the output voltage is small at a low rotational speed, making it difficult to put the apparatus to practical use.

A magneto-resistive device serving as a sensor provides an output with a constant magnitude without regard to the rotational speed. For this reason, the magneto-resistive device offers a benefit in that it can also be used for low rotational speeds as well. On the other hand, since the magnitude of the output is small, it must be amplified.

If the amplitude of a signal output by an amplifier for amplifying the signal output by the magneto-resistive device is increased excessively, however, too large a voltage is applied to devices employed in the circuit, giving rise to a possibility of malfunction. For this reason, in general, the signal output by the amplifier is limited so that its magnitude does not exceed a predetermined value. An amplification factor must thus be set so that, on the boundary between the region with teeth arranged continuously and the region with a missing tooth, the amplitude of the amplified signal for detecting the reference position is smaller than a predetermined limit. As a result, the amplitude of the amplified signal in the region with teeth arranged continuously can not be amplified sufficiently, giving rise to a problem that it is difficult to distinguish the signal output by the magneto-resistive device from existing noise.

SUMMARY OF THE INVENTION

It is an object of the present invention to provide a magnetic detection apparatus for detecting movement by means of magneto-electric conversion devices, wherein problems such as too large an amplified output signal, a nonuniform pulse period and a complicated circuit configuration can be solved so that the magnetic detection apparatus can be put to practical use.

According to the present invention, a bias magnetic field is generated by a bias magnet that is directed to an object of detection. A magneto-resistive device picks up changes in state of the bias magnetic field caused by the movement of the object of detection by converting the changes into an output electrical signal. In a region for detecting a reference position in the movement direction of the object of detection, a tooth is provided, but the shape of the tooth is deliberately made different from that of a plurality of uniform teeth provided on the remaining region at equal intervals. As an alternative, the region for detecting a reference position is provided with a detection portion different from the uniform detection portions provided on the remaining region. Accordingly, the change in state of the bias magnetic field or the change in magnetic-vector direction, which occurs during the passage of the tooth provided in the region for detecting a reference position or the detection portion of this region in the course of movement made by the object of detection, is small in comparison with an apparatus wherein a tooth is merely eliminated from the region for detecting a reference position. As a result, the increase in amplitude of the signal output by the magneto-resistive device can be suppressed. A binary conversion means is used for converting the signal output by the magneto-resistive device into binary data. Receiving the binary signal output by the binary conversion means, a reference-position detecting means detects the passage of the tooth provided in the region for detecting a reference position in the course of movement by the object of detection.

BRIEF DESCRIPTION OF THE DRAWINGS

Other features and advantages of the present invention will become more apparent from the following detailed description when read with reference to the accompanying drawings, in which:

FIG. 32 is an expansion diagram showing a portion XXXII of the gear shown in FIG. 30;

FIG. 33 is an expansion diagram showing a portion XXXIII of the gear shown in FIG. 30;

FIG. 34 is an expansion diagram showing a portion XXXIV of the gear;

DETAILED DESCRIPTION OF PREFERRED EXEMPLARY EMBODIMENTS (First Embodiment)

A first embodiment implementing a rotation detecting apparatus in accordance with the present invention is explained with reference to accompanying drawings.

Figure 1:
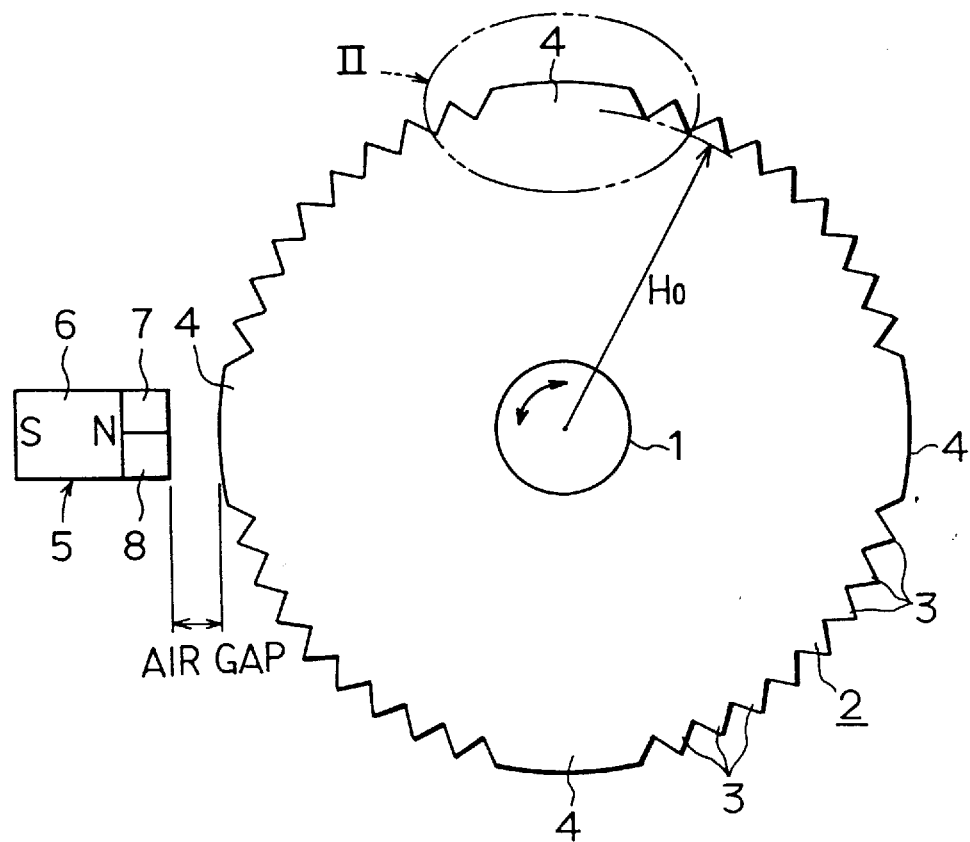
FIG. 1 is a diagram schematically showing a first embodiment implementing a rotation detecting apparatus in accordance with the present invention.
Figure 2:
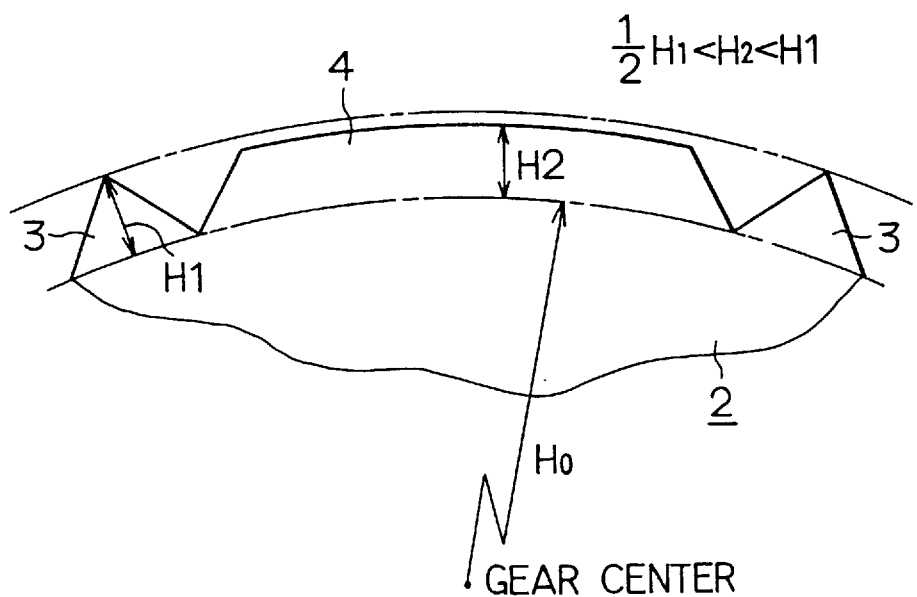
FIG. 2 is an enlarged diagram showing main elements of the first embodiment shown in FIG. 1.

FIG. 1 is a diagram schematically showing the first embodiment of the present invention and FIG. 2 is an enlarged diagram showing main elements of a portion A of the first embodiment shown in FIG. 1.

The present embodiment is an apparatus for detecting the rotation of a crankshaft of a spark ignition engine. A signal output by the rotation detecting apparatus is transmitted to an engine controlling apparatus to be used thereby for controlling the ignition time and for other purposes.

As is shown in FIG. 1, a rotation shaft 1 is linked to and driven by the crankshaft of the spark ignition engine and a gear (gear wheel) 2, the object of detection, is fixed to the rotation shaft 1. Made of a magnetic material such as iron, the gear 2 is a circular plate having a predetermined weight.

On the circumference surface of the gear 2, a number of uniform teeth 3, which are hereafter referred to triangular teeth, are formed continuously at equal angular intervals. The triangular teeth 3 each have a shape resembling an isosceles triangle. The height of the triangular teeth 3 in the radius direction of the gear 2 is H1. To be more specific, the triangular teeth 3 each form an isosceles triangle, whose height as measured from the circumference of a circle shown by a dot-and-chain line with the center thereof located at the center of the gear and having a radius of H0 is H1. The triangular teeth 3 are used for generating an angular signal.

Teeth 4 which each serve as a reference-position detection region as well as a rotation direction determining region and have a shape resembling a trapezoid are formed on the circumference surface of the gear 2 at every angular intervals of 90°. As such, the teeth 4 each have a shape different from that of the teeth 3 and are referred to hereafter as trapezoidal teeth. The height of the trapezoidal teeth 4 in the radius direction of the gear 2 is H2. The height H2 of the trapezoidal teeth 4 and the height H1 of the triangular teeth 3 have the following relation:

$$(½)·H1 < H2 < H1$$

That is to say, the height H2 of the trapezoidal teeth 4 is smaller than the height H1 of the triangular teeth 3 but larger than half the height H1.

A sensor body 5 is provided at a location, referred to hereafter as a proximity location, separated from the circumference surface of the gear 2 in the radius direction of the gear 2 by an air gap having a predetermined width. The sensor body 5 comprises a bias magnet 6, a ferromagnetic magneto-resistive element (MRE) 7 used as a first magneto-electric conversion device and a ferromagnetic magneto-resistive element (MRE) 8 serving as a second magneto-electric conversion device.

Figure 3:
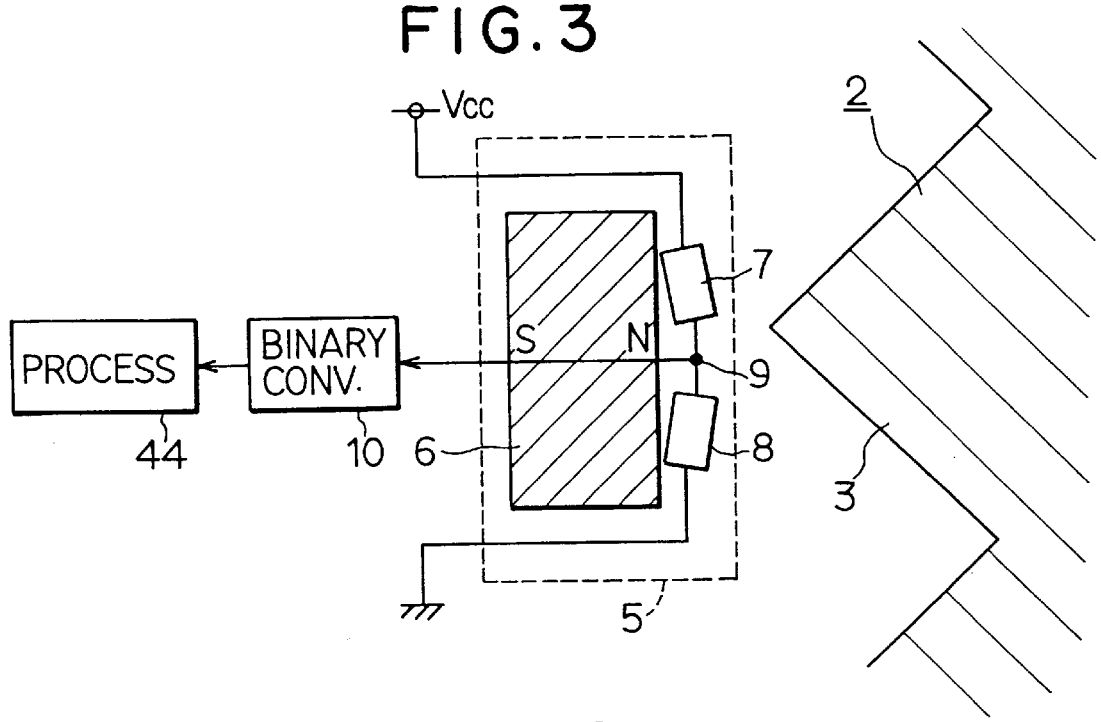
FIG. 3 is an explanatory diagram showing a positional relation and an electrical configuration of the first embodiment implementing a rotation detecting apparatus.
Figure 4:
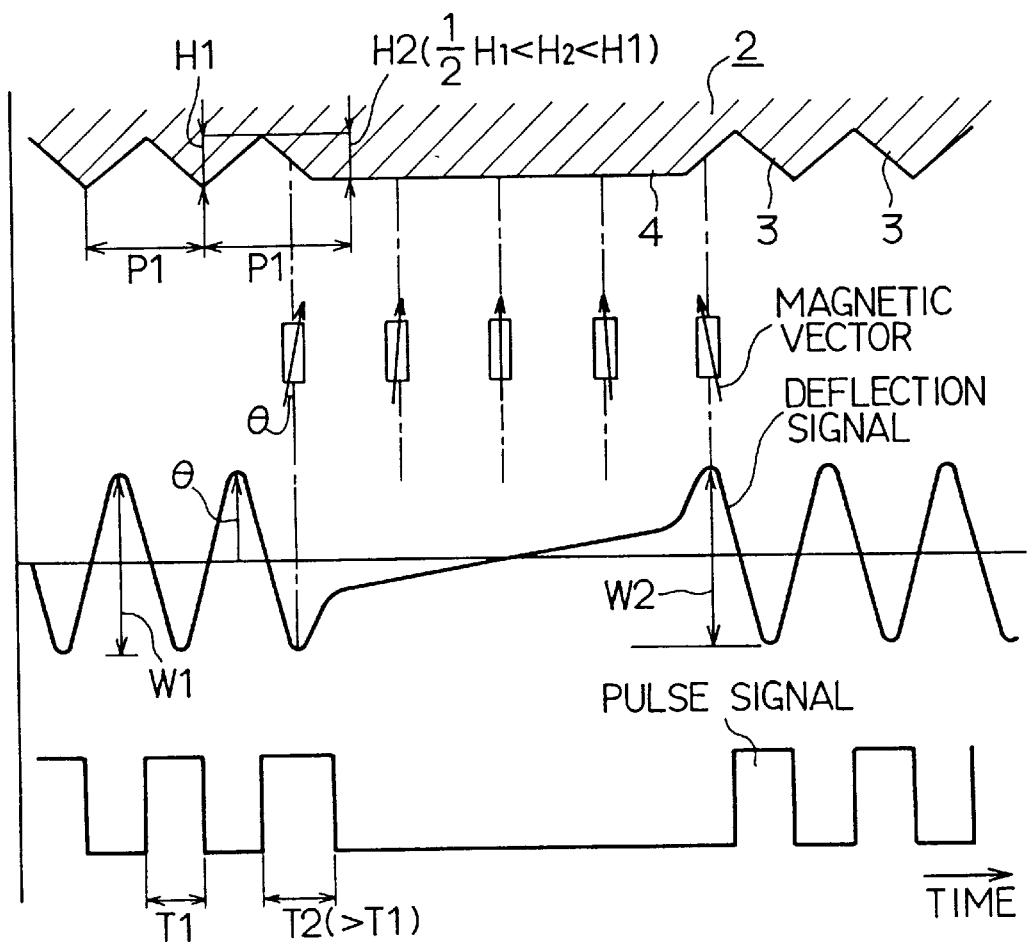
FIG. 4 shows time charts of signal waveforms and others of the first embodiment implementing a rotation detecting apparatus.

As is shown in FIG. 3, the bias magnet 6, which is a permanent magnet, has one surface serving as the magnetic N-pole and the surface on the other side serving as the magnetic S-pole. The N-pole magnetic surface of the bias magnet 6 is located at a position facing or closer to the circumference surface of the gear 2. The position of the N-pole magnetic surface which is called a proximity position is separated from the circumference surface in the radius direction of the gear 2 by a predetermined gap. A bias magnetic field is generated from the N-pole magnetic surface of the bias magnet 6 in a direction toward the gear 2. The MREs 7 and 8 are deposited on a substrate which is not shown in the figure. The MREs 7 and 8 are provided at positions, also called proximity positions, in the bias magnetic field separated from the circumference surface of the gear 2 in the radius direction of the gear 2 by a predetermined gap. In more detail, the MREs 7 and 8 are located on the circumference of a circle with the center thereof coinciding with that of the gear 2, being separated from each other by a predetermined gap. The gap between the MREs 7 and 8 is smaller than the pitch of the triangular teeth 3 of the gear 2. As is shown in FIG. 4, the rotation of the gear 2 indicated by the expansion of the gear 2 in the figure causes the bias magnetic field to change or causes the direction of its magnetic vector to change. The changes in magnetic-vector direction in turn vary the resistance values of the MREs 7 and 8.

As is shown in FIG. 3, the MREs 7 and 8 are connected to each other to form a half bridge. That is to say, the MREs 7 and 8 are connected to each other in series and a constant voltage Vcc is applied to one end of the series circuit. The other end of the series circuit is connected to the ground. The potential of a junction point between the MREs 7 and 8, referred to as an intermediate-point potential, is produced as a sensor output. A signal output by this half-bridge circuit is a deflection-angle signal which represents the deflection angle of the magnetic vector caused by the rotation of the gear 2 as is shown in FIG. 4.

In the case of the present embodiment, the MREs (the ferromagnetic magneto-resistive elements) 7 and 8 are installed in such a way that an angle formed by the sensor body 5 and the direction of the bias magnetic field is about 45° in magnitude. The gear 2 has a radius of 70 mm and 48 triangular teeth 3 are provided on the circumference thereof at equal intervals. The air gap is 1 mm in thickness.

Figure 5:
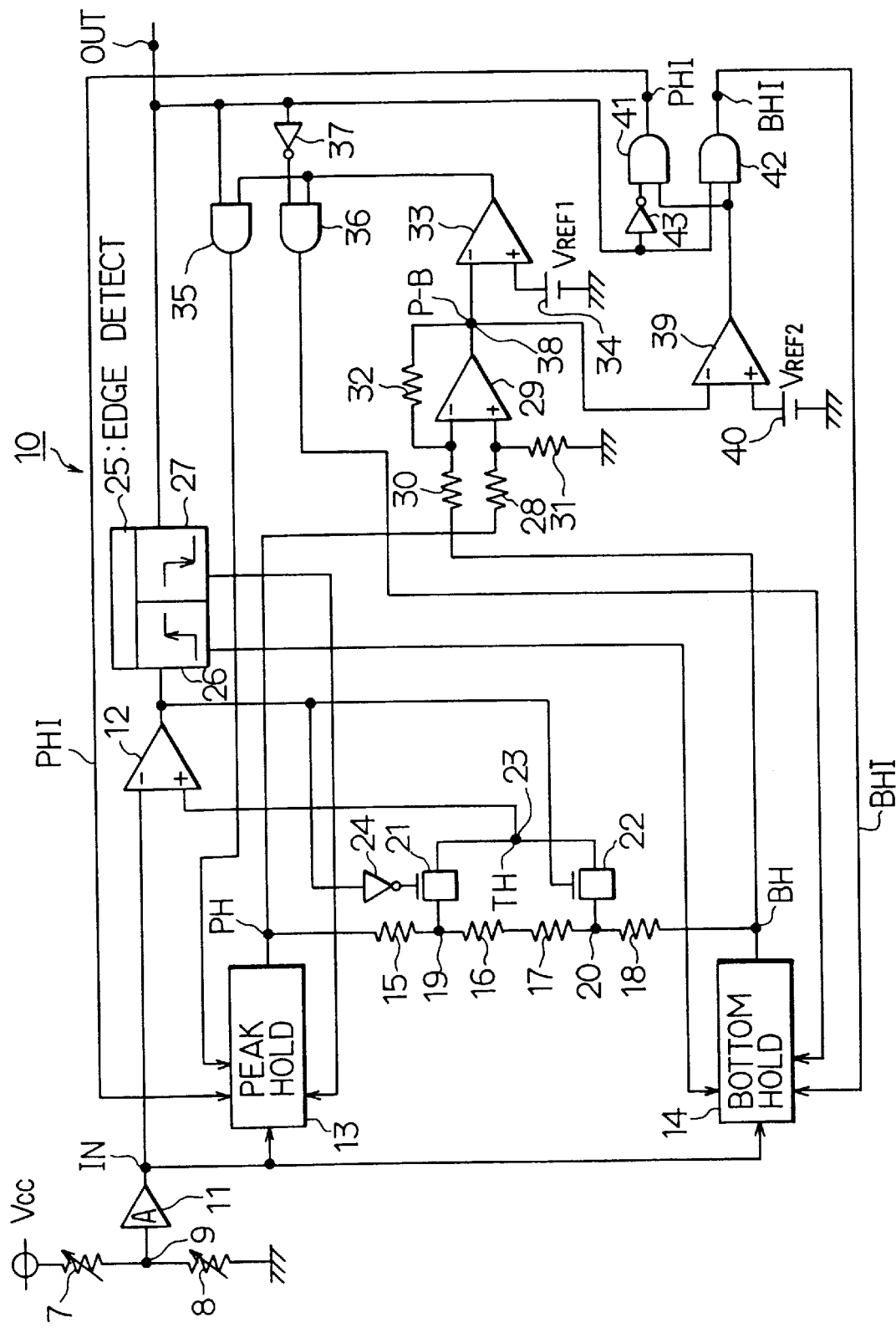
FIG. 5 is a diagram showing the configuration of a binary conversion circuit.

A binary conversion circuit 10 serving as a binary conversion means is connected to an output terminal 9 of the half-bridge circuit as is shown in FIG. 3. An actual configuration of the binary conversion circuit 10 is shown in FIG. 5. The binary conversion circuit 10 stores the peak and bottom values of a deflection signal waveform and alternately generates threshold values equal to ¼ and ¾ of the difference between the peak and bottom values. Binary values are then produced as a result of magnitude comparison of the output of the half-bridge circuit to those of the threshold values.

As shown in FIG. 5, the output terminal 9 of the half-bridge circuit is connected to an input inverting terminal of a comparator 12 through an amplifier 11. The output terminal of the amplifier 11 is connected to a peak hold circuit 13 and a bottom hold circuit 14. The peak hold circuit 13 holds the peak value of a waveform output by the half-bridge circuit whereas the bottom hold circuit 14 holds the bottom value of the waveform output by the half-bridge circuit.

Four resistors 15, 16, 17 and 18 forming a series circuit are interposed between the output terminal of the peak hold circuit 13 and the output terminal of the bottom hold circuit 14. Analog switches 21 and 22 form a series circuit connecting a junction point 19 between the resistors 15 and 16, and a junction point 20 between the resistors 17 and 18. A non-inverting input terminal of the comparator 12 is connected to a junction point between the analog switches 21 and 22. The output terminal of the comparator 12 is connected to a control terminal of the analog switch 22. The output terminal of the comparator 12 is also connected to a control terminal of the analog circuit 21 through a NOT circuit 24.

An edge detecting circuit 25 is connected to the output terminal of the comparator 12. The edge detecting circuit 25 comprises a rising-edge detecting unit 26 and a falling-edge detecting unit 27. The rising-edge detecting unit 26 detects only the rising edge of a signal output by the comparator 12, outputting a bottom reset signal to the bottom hold circuit 14. On the other hand, the falling-edge detecting unit 27 detects only the falling edge of a signal output by the comparator 12, outputting a peak reset signal to the peak hold circuit 13.

In the configuration explained so far, the signal output by the half-bridge circuit is amplified by the amplifier 11 and the magnitude of a signal output by the amplifier 11 is compared with the threshold values. As a result of the comparison, the comparator 12 outputs a signal at H (high) and L (low) levels. Either the analog switch 21 or 22 is turned on in accordance with the H and L levels of the signal output by the comparator 12, switching the potential of the non-inverting input signal of the comparator 12 from (¼)¥(PH-BH) to (¾)·(PH-BH) or vice versa where PH denotes the peak value held by the peak hold circuit 13 while BH is the bottom value held by the peak hold circuit 14. The output terminal of the peak hold circuit 13 is connected to a non-inverting input terminal of an operational amplifier 29 through a resistor 28. The output terminal of the bottom hold circuit 14 is, on the other hand, connected to an input inverting terminal of the operational amplifier 29 through a resistor 30. The non-inverting input terminal of the operational amplifier 29 is connected to the ground through a resistor 31. The output of the operational amplifier 29 is negatively fed back through a resistor 32.

The output terminal of the operational amplifier 29 is connected to an input inverting terminal of a comparator 33. A non-inverting input terminal of the comparator 33 is connected to a reference power supply 34. The output terminal of the comparator 33 is connected to one of the input terminals of an AND gate 35. Likewise, the output terminal of the comparator 33 is also connected to one of the input terminals of an AND gate 36 as well. The other input terminal of the AND gate 35 is connected to the output terminal of the comparator 12 whereas the other input terminal of the AND gate 36 is connected to the output terminal of the comparator 12 through a NOT circuit 37. The output terminal of the AND gate 35 is connected to the peak hold circuit 13 by a peak-value pulling-up line. Likewise, the output terminal of AND gate 36 is connected to the bottom hold circuit 14 by a bottom-value pulling-down line.

With the configuration explained so far, the operational amplifier 29 computes the difference between the peak-hold value (PH) and the bottom-hold value (BH). If this difference (PH-BH) is found smaller than a reference voltage VREF1 generated by the reference power supply 34, the comparator 33 outputs a "1" (H level). As a result, the peak value and the bottom value are raised and lowered toward 5V and 0V respectively in order to separate them away from each other in accordance with this output level. If this difference (PH-BH) is greater than the reference voltage VREF1 generated by the reference power supply 34, on the other hand, the comparator 33 outputs a "0" (L level), holding the difference (PH-BH) at a fixed value equal to the reference voltage VREF1.

A junction point 38 between the operational amplifier 29 and the comparator 33 is connected to the input inverting terminal of a comparator 39. The non-inverting input of the comparator 39 is, on the other hand, connected to a reference power supply 40. The output terminal of the comparator 39 is connected to one of the input terminals of an AND gate 41. The output terminal of the comparator 39 is also connected to one of the input terminals of an AND gate 42 as well. The other input terminal of the AND gate 42 is connected to the output terminal of the comparator 12. The other input terminal of the AND gate 41 is also connected to the output terminal of the comparator 12 through a NOT gate 43. The output terminal of the AND gate 41 is connected to the peak hold circuit 13 by a peak hold inhibit signal line. Likewise, the output terminal of AND gate 42 is connected to the bottom hold circuit 14 by a bottom-hold inhibit signal line.

With the configuration explained so far, in the course of peak-value holding, a bottom hold inhibit signal (BHI) is generated to inhibit holding of the bottom value as long as the bottom value does not deviate by a predetermined voltage difference. In this way, the threshold value is always greater than the waveform output by the bridge circuit, sustaining the output at an H level. Similarly, the opposite holds true. That is to say, in the course of bottom-value holding, a peak hold inhibit signal (PHI) is generated to inhibit holding of the peak value as long as the peak value does not deviate by a predetermined voltage difference. In this way, the threshold value is always smaller than the waveform output by the bridge circuit, sustaining the output at an L level.

The binary conversion circuit 10 having such a configuration reshapes the waveform of the deflection-angle signal shown in FIG. 4, converting the deflection-angle signal into an output binary pulse signal.

It should be noted that, since the binary conversion circuit 10 shown in FIG. 5 is the same as a circuit disclosed by the patent applicant in Japanese Patent Laid-open No. 6-300584, the description of the detailed operation thereof and other features are omitted.

Figure 6:
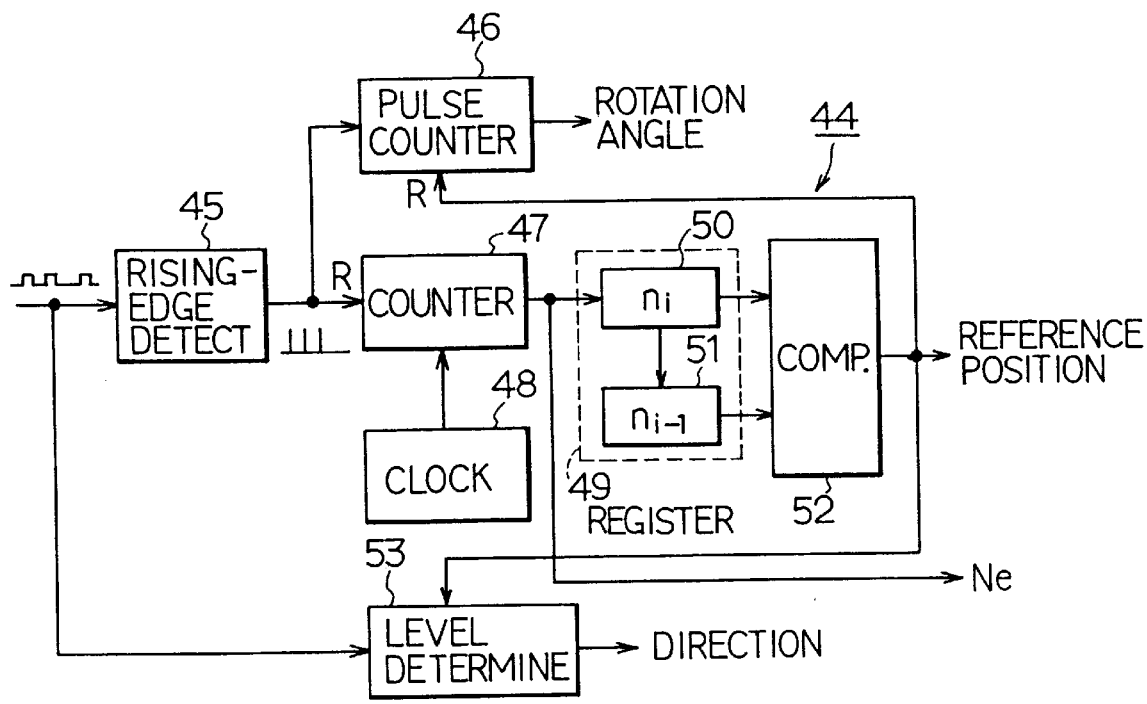
FIG. 6 is a diagram showing the configuration of a processing circuit.
Figure 7:
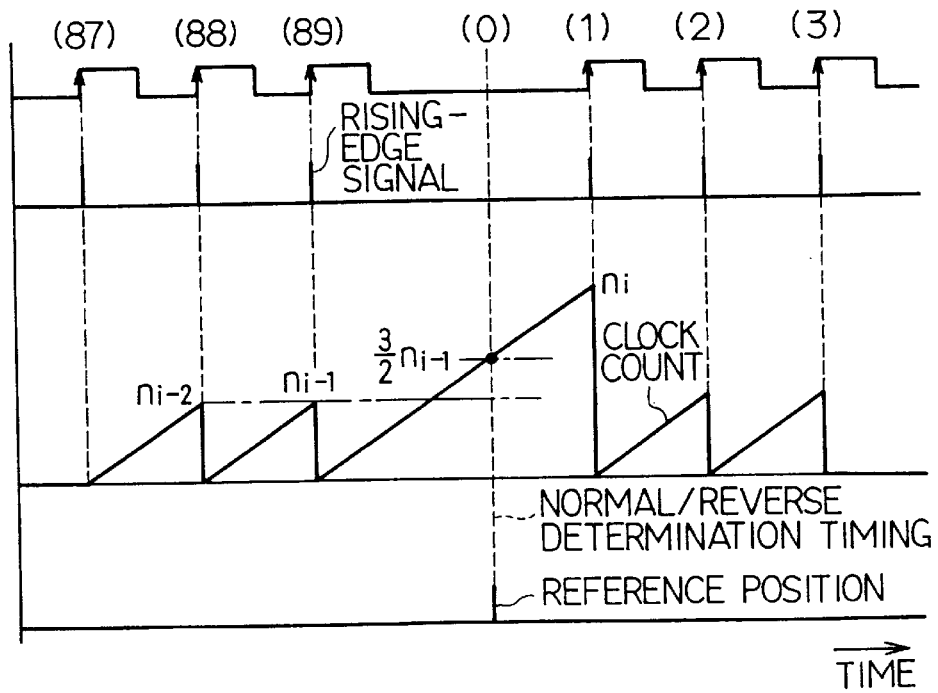
FIG. 7 shows time charts of signal waveforms and others of the first embodiment implementing a rotation detecting apparatus.

As is shown in FIG. 3, the output terminal of the binary conversion circuit 10 is connected to a processing circuit 44 which serves as a reference-position detecting means as well as a movement-direction detecting means. The configuration of the processing circuit 44 is shown in FIG. 6. As is shown in the figure, the output terminal of the binary circuit 10 is connected to a rising-edge detecting circuit 45. As is shown in FIG. 7, the rising-edge detecting circuit 45 detects the rising edges of the pulse signal (FIG. 4). On the rising edges of the pulse signal, rising-edge detection signals are output. A pulse counter 46 is connected to the rising-edge detecting circuit 45 shown in FIG. 6. The pulse counter 46 increments the count value thereof every time a rising-edge detection signal is input from the rising-edge detecting circuit 45 as is indicated by numbers (1), (2), (3), shown in FIG. 7.

A counter 47 is also connected to the rising-edge detecting circuit 45 shown in FIG. 6. The counter 47 receives a clock signal from a clock generating circuit 48 as is shown in FIG. 7. The counter 47 counts the number of clock signal pulses output by the clock generating circuit 48, incrementing a count value n thereof. The counter 47 initializes the count value n to zero when it receives a rising-edge detection signal from the rising-edge detecting circuit 45. The output terminal of the counter 47 shown in FIG. 6 is connected to a register 49 which comprises first and second storage portions 50 and 51. The register 49 sequentially stores the count values n each indicating the pulse period one after another, which count values n are received from the counter 47, in the first storage portion 50. When a next count value n indicating the next pulse period is received, the previous count value, a largest count value indicating the previous pulse period stored in the first storage portion 50, is transferred to the second storage portion 51. The next count value is then stored in the first storage portion 50.

The register 49 is connected to a comparator circuit 52 for comparing a value 1.5 times the previous count value $n_{i-1}$, i.e., $(3/2) \cdot n_{i-1}$, stored in the second storage portion 51 to the present count value $n_i$ stored in the first storage portion 50 as is shown in FIG. 7. If the count value $n_i$ stored in the first storage portion 50 is found greater than the count value $n_{i-1}$ stored in the second storage portion 51, a reference position detection signal is output as is shown in the figure. The reference-position detection signal is transmitted to the pulse counter 46 shown in FIG. 6, initializing or resetting the count value of the pulse counter 46.

As is shown in FIG. 6, the output terminal of the binary conversion circuit 10 is connected to a level determining circuit 53 which receives the reference position detection signal generated by the comparator circuit 52. When the reference-position detection signal shown in FIG. 7 is received or at a normal/reverse determination time $(3/2) \cdot n_i$ determined by the comparator circuit 52, the level determining circuit 53 determines the level of the pulse signal generated by the binary conversion circuit 10. If the pulse signal is at the L level, a signal indicating a normal rotation is output. If the pulse signal is at the H level, on the other hand, a signal indicating a reverse rotation is output.

The operation of the rotation detecting apparatus having such a configuration is explained as follows.

As is shown in FIG. 4, a bias magnetic field is generated by the bias magnet 6 toward the gear 2. The rotation of the gear 2 causes the magnetic vector generated in the tangential-line direction of the gear 2 varies. The variations in magnetic vector are produced as an electrical signal by means of the MREs 7 and 8. A deflection angle signal is further output by a half-bridge circuit comprising the MREs 7 and 8. The deflection angle signal output by the half-bridge circuit is converted by the binary conversion circuit 10 into an output binary pulse signal. The pulse signal output by the binary conversion circuit 10 is processed by the processing circuit 44. That is, the edges of the pulse signal are detected by the rising-edge detecting circuit 45 and the pulse counter 46 increments the contents thereof every time an edge is detected. The counter 47 counts the number of clock-signal pulses output by the clock generating circuit, initializing the count value thereof every time an edge is detected. In this way, the period of the pulse signal can be measured by means of the counter 47. A count signal (or a pulse period detection signal) is output to an engine control apparatus which is not shown in the figure. The engine control apparatus receives the pulse-period detection signal in order to monitor the rotational speed (Ne) of the engine. The reciprocal number of the pulse period is interpreted as the rotational speed of the engine.

The comparison circuit 52 compares a value equal to 1.5 times the count value ni−1 (or the previous pulse period) stored in the second storage portion 51 of the register 49 to the count value ni (or the currently measured pulse period) stored in the first storage portion 50. If the count value ni stored in the first storage portion 50 is greater than 1.5 times the count value ni−1 stored in the second storage portion 51, a reference position detection signal detecting the passage of the trapezoidal tooth 4 of the gear 2 is output. That is to say, a reference position at a rotational angle of 0°, 90°, 180° or 270° in the 360-degree rotation of the gear 2 is detected by the comparison result.

The reference position detection signal is used to initialize the count value of the pulse counter 46. The count value represents the rotational angle (or the rotational position) of the gear 2. In other words, a count value is generated in the pulse counter 46 to represent an angle in the range 0° to 90°, 90° to 180°, 180° to 270° or 270° to 360° of the 360-degree rotation of the gear 2. A rotational angle detection signal representing the count value is output by the pulse counter 46. The rotational angle detection signal is transmitted to the engine controlling apparatus. Receiving the rotational angle detection signal, the engine controlling apparatus controls the ignition timing of the engine in accordance with the operating state of the engine.

On the other hand, the level determining circuit 53 detects the level of the pulse signal output by the binary conversion circuit 10 at the time the reference position detection signal is received from the comparator circuit 52. If the pulse signal is at the L level, a rotation direction detection signal indicating a normal rotation is output by the level determining circuit 53. If the pulse signal is at the H level, on the other hand, a rotation direction detection signal indicating a reverse rotation is output by the level determining circuit 53. The rotation-direction detection signal is supplied to the engine controlling apparatus. If the rotation direction detection indicates a reverse rotation of the crankshaft of the engine, the engine controlling apparatus carries out processing such as stopping the ignition forcibly in order to protect the engine.

Operations of the processing are explained with reference to FIGS. 8 and 9.

Figure 8:
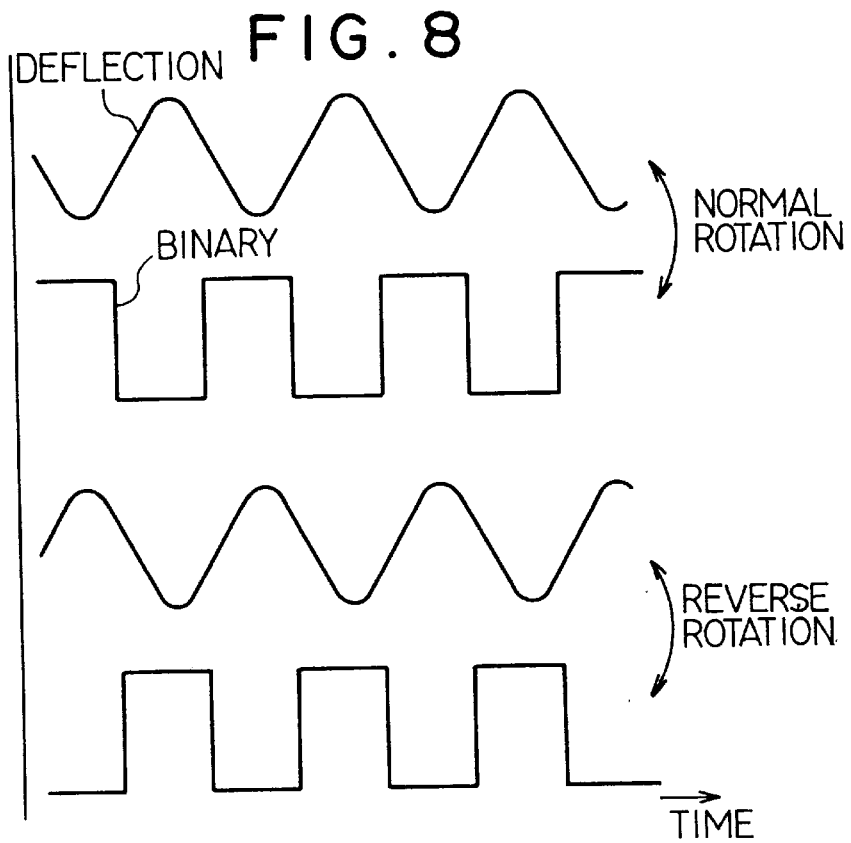
FIG. 8 shows time charts of signal waveforms and others of the first embodiment implementing a rotation detecting apparatus.

FIG. 8 shows the binary pulse signal resulting from the waveform processing of the deflection angle signal which is carried out as the triangular teeth 3 of the gear 2 pass through the neighborhood of the MREs 7 and 8 at the time the gear 2 is rotated in the normal and reverse directions. As is shown in the figure, when the gear 2 is rotated in the reverse direction, the deflection angle signal is inverted in polarity. The binary signal resulting from the waveform processing is also inverted in signal level accordingly.

Figure 9:
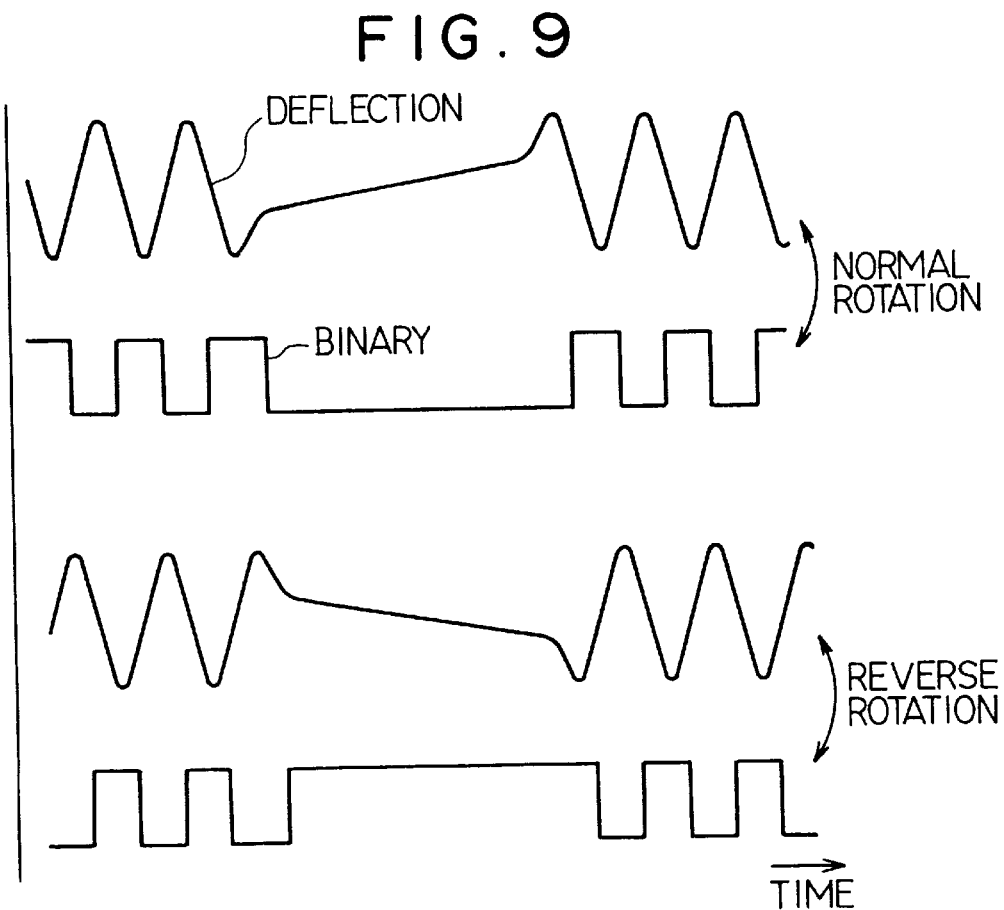
FIG. 9 shows time charts of signal waveforms and others of the first embodiment implementing a rotation detecting apparatus.

FIG. 9 shows a binary signal resulting from the waveform processing of the deflection angle signal which is carried out as the trapezoidal teeth 4 of the gear 2 pass through the MREs 7 and 8 at the time the gear 2 is rotated in the normal and reverse directions. As is shown in the figure, the period of the binary pulse signal resulting from the passing of a trapezoidal tooth 4, which has a different shape from that of the triangular tooth 3, is long. By detecting this long pulse interval, a reference position can be recognized and the H or L level of this pulse gap can be used to determine the direction of the rotation.

Figure 10:
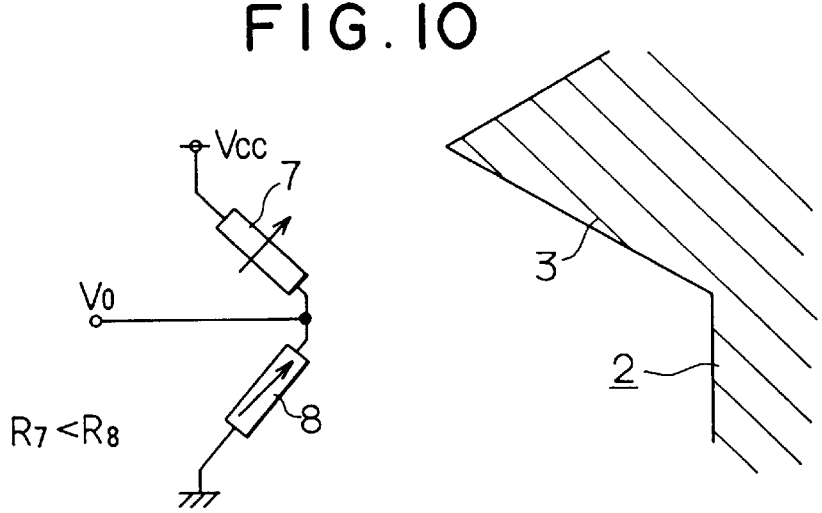
FIG. 10 is an explanatory diagram showing a positional relation between an MRE and a gear.
Figure 11:
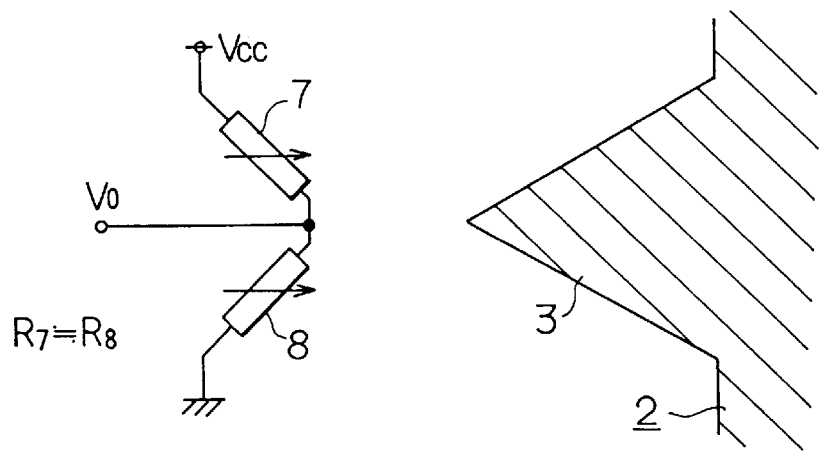
FIG. 11 is an explanatory diagram showing a positional relation between the MRE and the gear.
Figure 12:
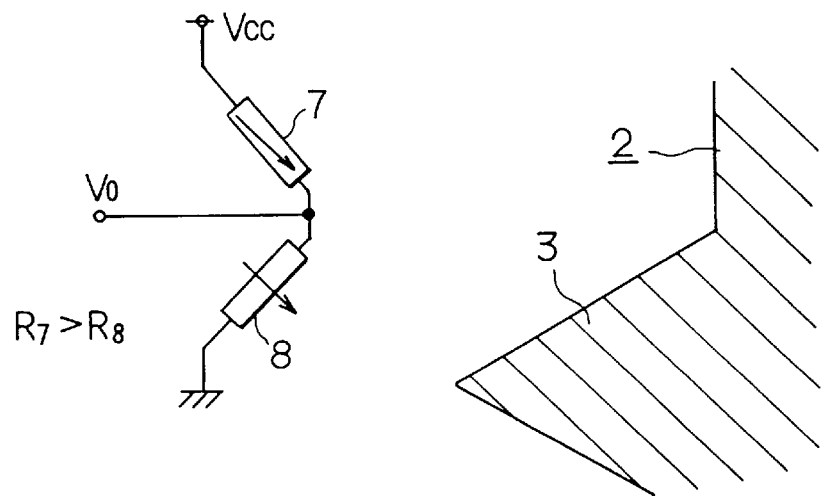
FIG. 12 is an explanatory diagram showing a positional relation between the MRE and the gear.

FIGS. 10 to 15 are diagrams used for briefly explaining constructions for inverting the deflection angle signal in accordance with the rotational direction of the gear 2. FIG. 10 shows a posture of the gear 2 with the triangular tooth 3 of the gear 2 positioned on the side close to the MRE 7. With this posture, R7<R8, where R7 and R8 are the resistance values of the MREs 7 and 8 respectively. FIG. 11 shows a posture of the gear 2 with the triangular tooth 3 of the gear 2 positioned equally between the MREs 7 and 8. With this posture, R7 is substantially equal to R8. FIG. 12 shows a posture of the gear 2 with the triangular tooth 3 of the gear 2 positioned on the side close to the MRE 8. With this posture, R7>R8.

Figure 13:
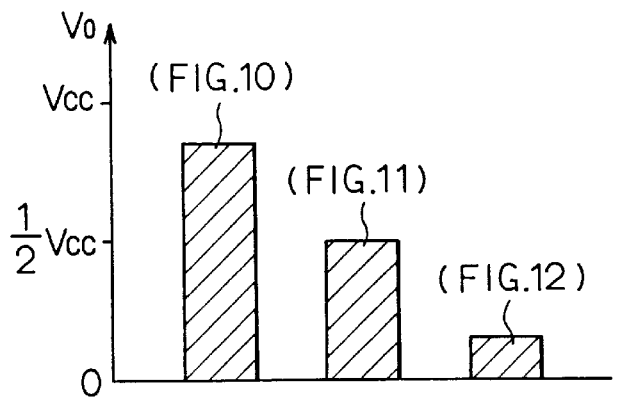
FIG. 13 is a diagram showing outputs of a half-bridge circuit at a variety of locations.
Figure 14:
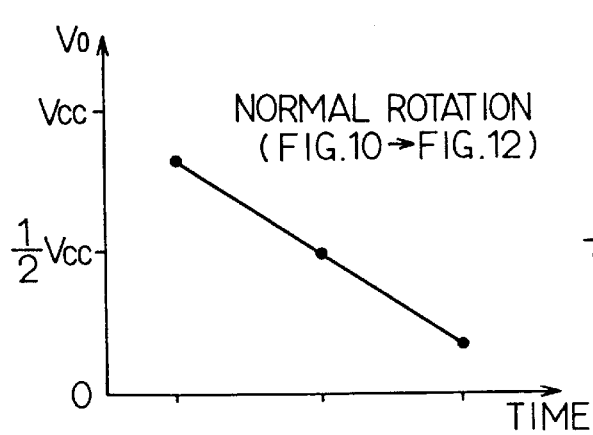
FIG. 14 is a characteristic diagram showing changes in output of the half-bridge circuit.
Figure 15:
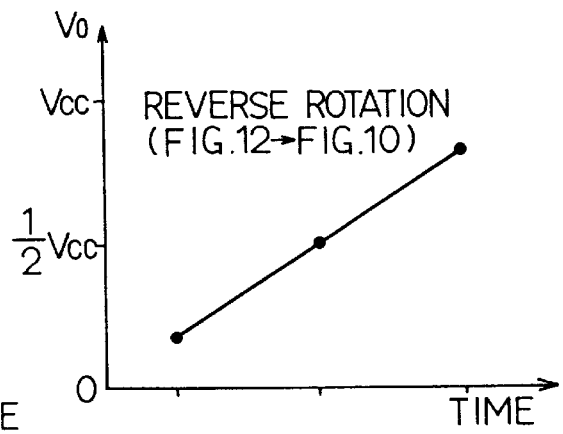
FIG. 15 is a characteristic diagram showing changes in output of the half-bridge circuit.

The direction of the magnetic vector of the bias magnetic field applied to the MREs 7 and 8 changes in accordance with the position of the tooth 3, causing the magnitudes of the resistances of the MREs 7 and 8 to vary as described above. Accordingly, the voltage VO output by the half-bridge circuit has different magnitudes for the positions of the triangular tooth 3 shown in FIGS. 10, 11 and 12 as shown in FIG. 13. As a result, the voltage Vo output by the half-bridge circuit changes as is shown in FIG. 14 in the case of a normal rotation since the position of the tooth 3 changes in accordance with the sequence of FIG. 10→FIG. 11→FIG. 12 or changes as is shown in FIG. 15 in the case of a reverse rotation since the position of the tooth 3 changes according with the sequence FIG. 12→FIG. 11→FIG. 10.

With the half-bridge circuit comprising the MREs 7 and 8, the voltage Vo output by the half-bridge circuit is determined by the position of the tooth 3 of the gear 2. For this reason, when the gear 2 is rotating in the reverse direction, the deflection-angle signal is inverted. Due to a mutual effect of the teeth 3 of the gear 2 adjacent to each other, however, the deflection angle of the magnetic vector (or the output of the half-bridge circuit) does not increase as is shown in FIGS. 14 and 15. Instead, the deflection returns to an original value as the deflection goes to a certain degree. That is, as the next tooth 3 of the gear 2 comes closer, the deflection gets oriented in the direction to the next tooth 3 of the gear 2. In this way, a sinusoidal deflection-angle signal is obtained.

Figure 16:
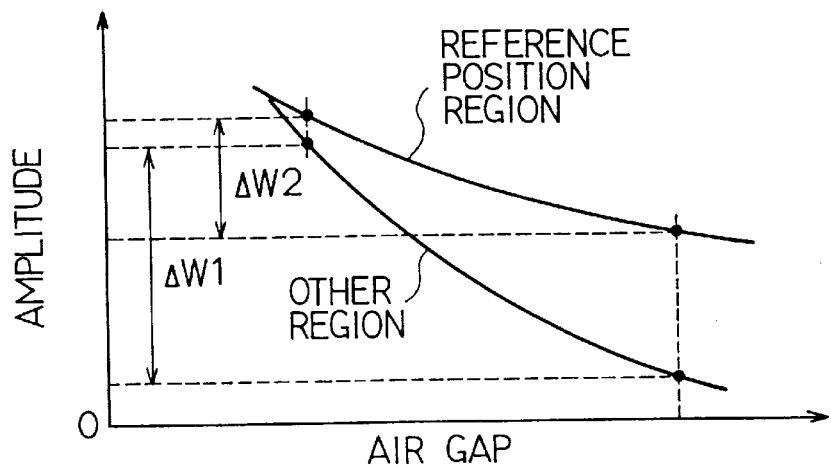
FIG. 16 is a characteristic diagram showing relations between an air gap and an amplitude.

On the other hand, the amplitude of the deflection angle signal has a tendency to decrease as the air gap between the tooth tip of the gear 2 and the end of the sensor body 5 (the MREs 7 and 8) is widened as is shown in FIG. 16. For this reason, in an application with a wide air gap, it is necessary to sufficiently amplify the deflection angle signal. However, a portion where the amplitude of the deflection angle signal is large becomes a hindrance. That is, the rate of decrease in amplitude $\Delta W1$ due to a change in air gap width for the regions other than the reference positions is different from the rate of decrease in amplitude $\Delta W2$ due to the change in air gap width for the reference positions. Since the rate of decrease in amplitude $\Delta W1$ due to the change in air gap width for the regions other than the reference positions is greater than the rate of decrease in amplitude $\Delta W2$ due to the change in air gap width for the reference positions, for a wide air gap, the amplitude at the reference positions is much greater than that for the regions other than the reference positions. As a result, the waveform shaping does not work well. It is thus necessary to reduce the amplitude of the deflection angle signal for the reference positions at which the direction of the rotation is recognized and the reference-position detection signal is generated.

Figure 17:
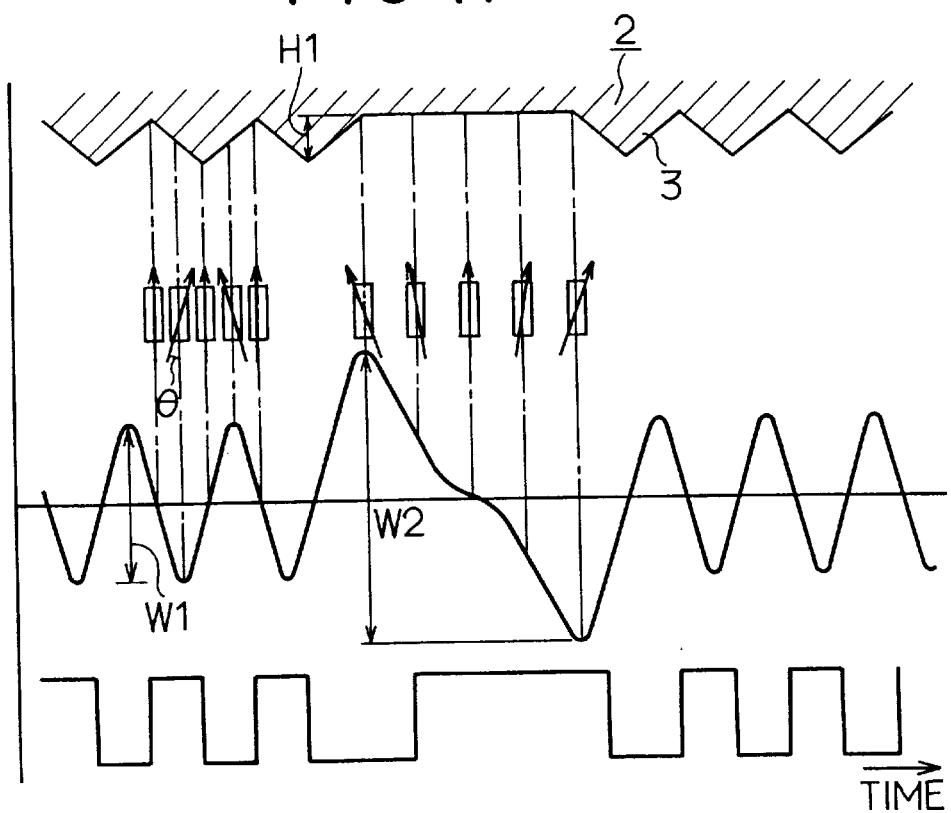
FIG. 17 shows time charts of signal waveforms and others for comparison purposes.

As is shown in FIG. 17, it is assumed that a tooth 4 is eliminated from the circumference of the gear 2. As the MRE approaches the portion with a missing tooth from an adjacent portion with a tooth provided, the bias magnetic field (or the magnetic vector) greatly changes in the direction toward the tooth. The amplitude of a signal output by the MRE (or the deflection angle signal) increases (W2>W1), where W2 is the amplitude of the deflection angle signal generated at the reference position and W1 is the amplitude of the deflection angle signal generated at locations other than a reference position, resulting in a hindrance in the amplification of the deflection-angle signal. In the case of this embodiment, however, the trapezoidal teeth 4 are provided as are shown in FIG. 4, suppressing the maximum deflection angle output at the trapezoidal feet 4 to a magnitude of the order of the maximum deflection angle produced at the triangular teeth 3. As a result, the amplitude of the deflection angle signal produced at the reference positions can be prevented from being increased or W2 is all but equal to W1.

Figure 18:
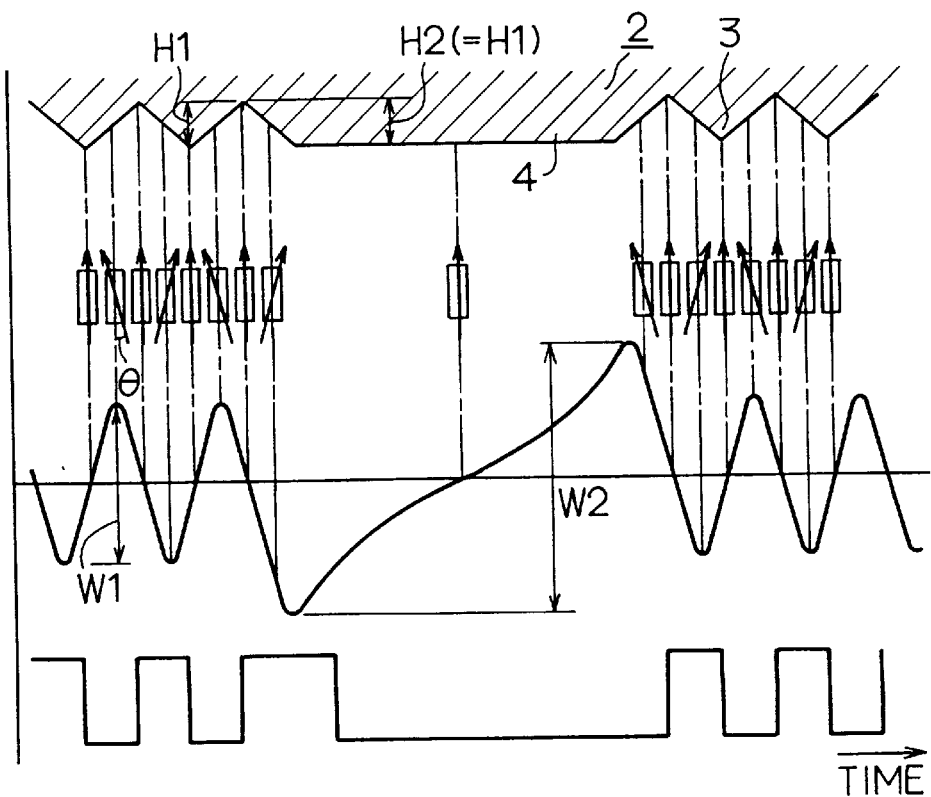
FIG. 18 shows time charts of signal waveforms and others for comparison purposes.

FIG. 18 shows variations in magnetic vector direction, the deflection angle signal and a waveform resulting from the waveshaping for a case in which the height H2 of the trapezoidal teeth 4 is made equal to the height H1 of the triangular teeth 3. Also in this case, the amplitude W2 of the deflection angle signal is still large as is shown in the figure.

Figure 19:
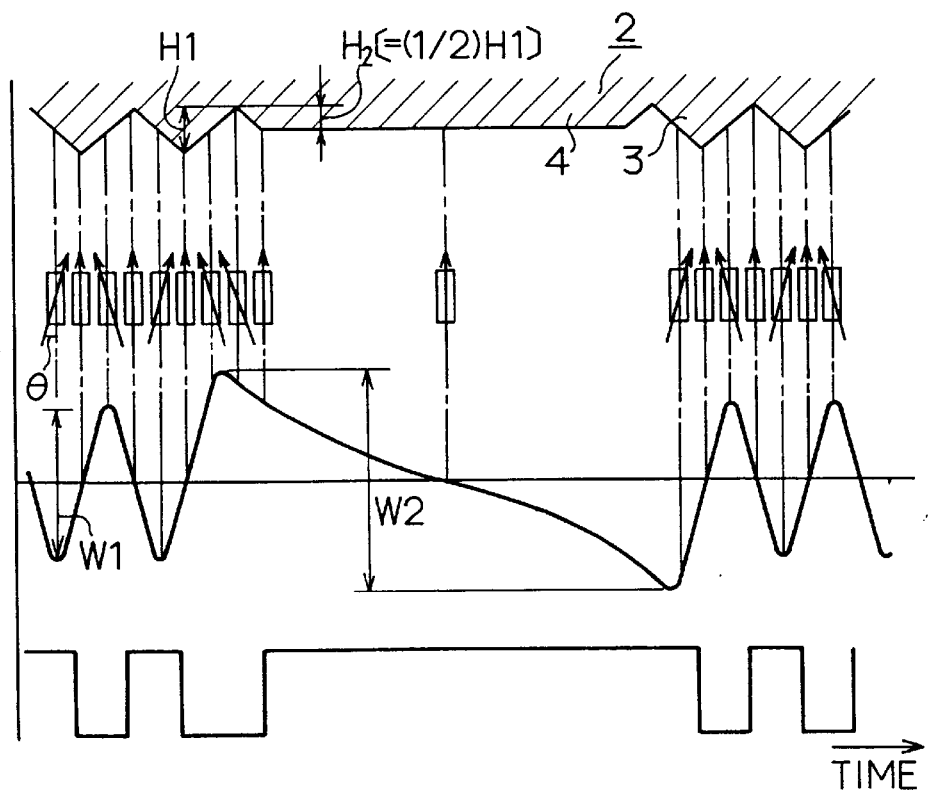
FIG. 19 shows time charts of signal waveforms and others for comparison purposes.

This is because, since the magnetic portion of the trapezoidal tooth 4 is large, the direction of the bias magnetic field greatly changes as the trapezoidal tooth 4 approaches the MREs 7 and 8. For this reason, the amplitude of the deflection-angle signal also greatly changes as well. FIG. 19 shows variations in magnetic-vector direction, the deflection angle signal and a waveform resulting from the waveshaping for a case in which the height H2 of the trapezoidal teeth 4 is made equal to half the height H1 of the triangular teeth 3. In this case, the amplitude W2 of the deflection-angle signal is smaller than that of the cases shown in FIGS. 17 and 18. The amplitude W2 still can hardly be sufficiently small.

As has been described by referring to FIGS. 17, 18 and 19, it is obvious that the height H2 of the trapezoid tooth 4 needs to be kept in the range $(\frac{1}{2}) \cdot H1 < H2 < H1$ in order to substantially reduce the amplitude W2 of the deflection angle signal.

Figure 20:
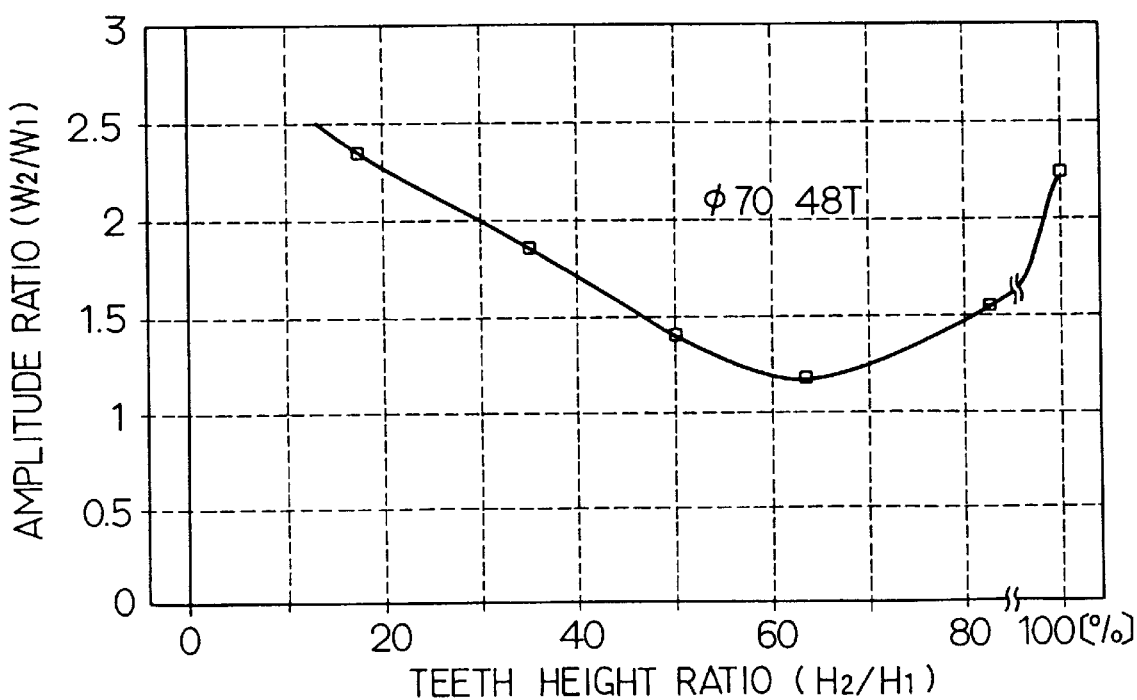
FIG. 20 is a characteristic diagram showing a relation between a ratio of the height of a tooth at a reference-position detection region to the height of uniform teeth and an amplification gain.

FIG. 20 shows a detailed result of a study of a relation between the height H2 of the trapezoidal tooth 4 and the amplitude W2 of the deflection angle signal. The horizontal axis of the figure represents the ratio (H2/H1) of the tooth height at the reference position to that at the region other than the reference position whereas the vertical axis represents the amplitude ratio (W2/W1) where W2 is the amplitude of the deflection angle signal of the trapezoidal tooth 4 at the reference position and W1 is the amplitude of the deflection angle signal of the triangular tooth 3 at the region other than the reference position. It is obvious from the figure that, if the height H2 of the trapezoidal tooth 4 for detecting a reference position is set in the range 50% to 80% of the height H1 of the triangular teeth 3 provided at equal intervals, the amplitude of the deflection angle signal for the trapezoidal tooth 4 at a reference position can be suppressed to a ratio smaller than 1.5 times the amplitude of the deflection angle signal for the region in which the triangular teeth 3 are provided at equal intervals.

As described above, in this embodiment, a number of uniform triangular teeth 3 are formed on the circumference of the gear 2 at equal intervals and trapezoidal teeth 4 each having a shape different from that of the triangular teeth 3 are provided on the circumference at regions for detecting reference positions. In such an arrangement of teeth, a variation in magnetic-field state (or a variation in magnetic-vector direction) which occurs when the trapezoidal tooth 4 passes through the neighborhood of the MREs 7 and 8 in a rotation made by the gear 2 is smaller than an arrangement with a tooth merely eliminated from a region used for detecting a reference position, allowing an increase in amplitude of a signal output by the MREs 7 and 8 to be suppressed. As a result, the amplification factor for the deflection angle signal can be raised and this embodiment can cope with a case in which it is necessary to use the sensor body 5 comprising the MREs 7 and 8 at a large air gap.

A number of uniform triangular teeth 3 are formed on the circumference of the gear 2 at equal intervals and trapezoidal teeth 4 each having a shape different from that of the triangular teeth 3 are provided on the circumference at regions for recognizing the direction of the rotation. The MREs 7 and 8 are provided, being separated away from each other in the rotational direction of the gear 2 by a predetermined distance. The MREs 7 and 8 form a half-bridge circuit for generating the voltage signal used for detecting the passing of the trapezoidal tooth 4 during a rotation made by the gear 2. The level of the pulse signal can be used to recognize the direction of the rotation at the time the passage of trapezoidal tooth 4 is detected. In this way, the direction of movement can be recognized by means of a simple configuration.

Since the trapezoidal tooth 4 has a height H2 in a direction toward the MREs 7 and 8 different from the height of the triangular tooth 3, at a region for detecting a reference position and a region for recognizing the direction of rotation, a signal different from a signal indicating a change in state of the bias magnetic field generated at other regions can be obtained. Since the height H2 of the trapezoidal tooth 4 is smaller than the height H1 of the triangular tooth 3, the change in magnetic-field state (or the change in magnetic-vector direction) is small and, thus, the amplitude of a signal output by the MREs 7 and 8 is also small in comparison with a design wherein the height H1 of the trapezoidal tooth 4 is equal to the height H2 of the triangular tooth 3. Since the height H1 of the trapezoidal tooth 4 is greater than half the height H2 of the triangular tooth 3, the change in magnetic-filed state (or the change in magnetic-vector direction) can be made even smaller and, thus, the amplitude of a signal output by the MREs 7 and 8 can also be reduced further.

(Second Embodiment)

Next, a second embodiment is explained by focusing on differences from the first embodiment as follows.

Figure 21:
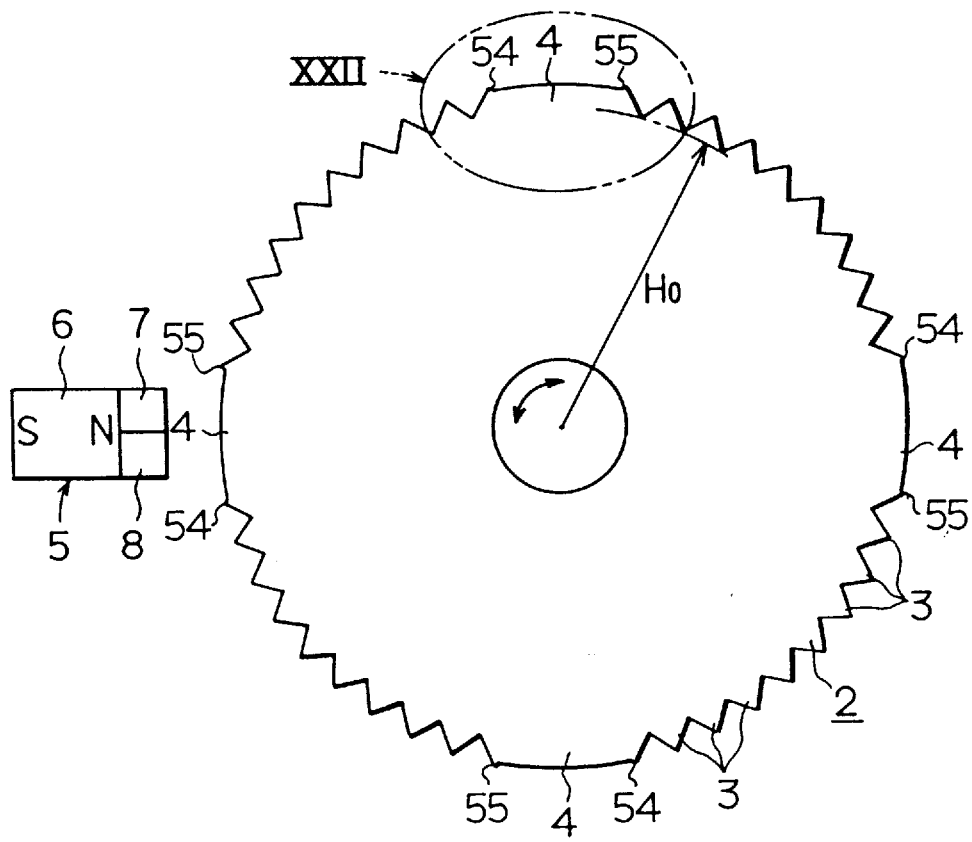
FIG. 21 is a diagram schematically showing a second embodiment implementing a rotation detecting apparatus in accordance with the present invention.
Figure 22:
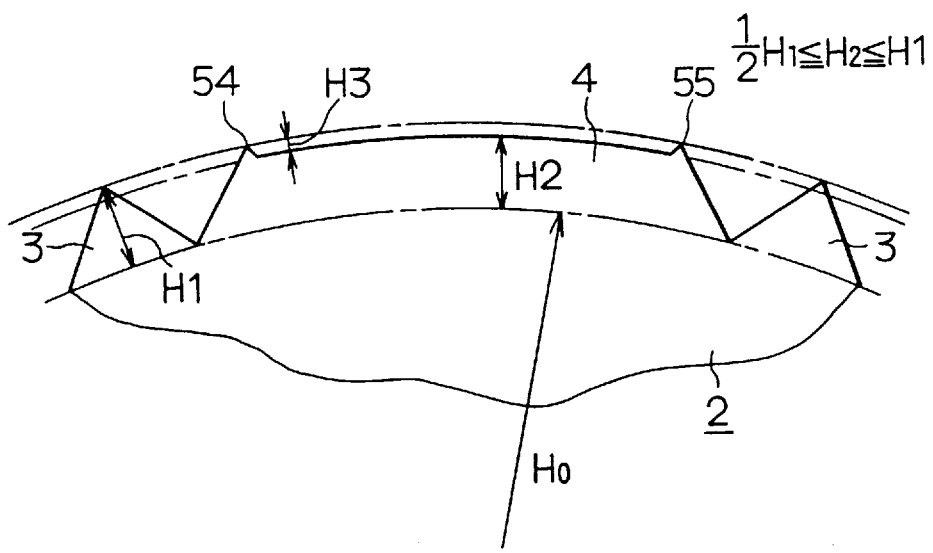
FIG. 22 is an enlarged diagram showing main elements of the second embodiment shown in FIG. 21.

FIG. 21 is a diagram schematically showing the second embodiment implementing a rotation detecting apparatus. FIG. 22 is a diagram showing an enlarged portion XXII of FIG. 21.

A trapezoidal tooth 4 has a trapezoidal shape with a height H2 in the radius direction of the gear 2. The height H2 of the trapezoidal tooth 4 is smaller than the height H1 of a triangular tooth 3 but larger than half the height H1. At the edges of the trapezoidal tooth 4, protrusions 54 and 55 are formed to provide an integrated single body with the trapezoidal tooth 4. The protrusions 54 and 55 each have a triangular shape with a predetermined thickness. The height of the protrusions 54 and 55 is H3, where H3=H1−H2. That is, the height (H2+H3) of the vertices of the protrusions 54 and 55 is equal to that (H1) of the vertex of the triangular tooth 3.

By making the height H2 of the trapezoidal tooth 4 smaller than the height H1 of the triangular tooth 3 by a difference in a predetermined range, the increase in magnetic-field deflection caused by the trapezoidal tooth 4 can be suppressed. The amplitude of the deflection-angle signal at the passage of the trapezoidal tooth 4 can also be suppressed as well to a magnitude of the same order of the amplitude of the deflection angle signal at the passage of the triangular tooth 3. On this trapezoidal tooth 4, however, the restoration of the change of the magnetic field pertaining to the trapezoidal tooth 4 is slow. As a result, the pulse width (T2) of the binary signal immediately before the region for detecting a reference position (or the region for recognizing the direction of the rotation) becomes greater than the pulse width (T1) at other regions, or T2>T1 as is shown in FIG. 4. As such, the slope of the waveform of the deflection angle signal at a reference position is gradual in comparison with that of the waveform at a region where the triangular tooth 3 is provided. For this reason, the width of the pulse on the boundary between a region for providing the triangular tooth 3 and a region for providing the trapezoidal tooth 4 has a tendency to increase which tendency is not desirable.

Figure 23:
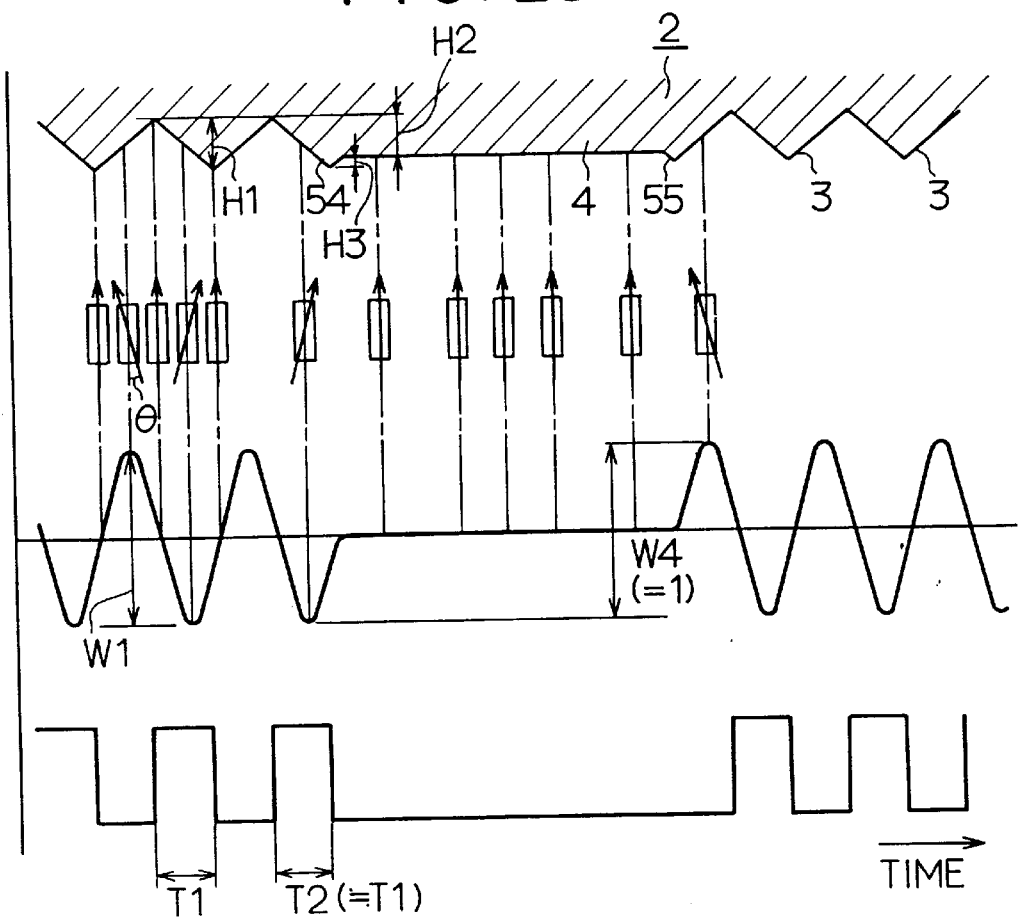
FIG. 23 shows time charts of signal waveforms and others of the second embodiment implementing a rotation detecting apparatus.

In order to solve this problem, in the case of the present embodiment, the protrusions 54 and 55 having the predetermined height H3 are provided on the trapezoidal tooth 4. As shown in FIG. 23, the protrusions 54 and 55 make the restoration of the change of the magnetic field faster, resulting in the pulse width or period (T2) of the binary pulse signal immediately before the region for detecting a reference position (or the region for recognizing the direction of the rotation) of about the same order as the pulse width (T1) at the other regions.

In this way, the pulse width disturbance of the binary signal at the trapezoidal tooth 4 can be avoided. As a result, a uniform pulse width is obtained, allowing the angular position to be detected with a high degree of accuracy.

Depending upon the wave-shaping technique, the protrusions 54 and 55 can also be provided only on the side which approaches the MREs 7 and 8 first.

As described above, in the case of the present embodiment, the protrusions 54 and 55 protruding toward the MREs 7 and 8 are provided at least on the edge of the trapezoidal tooth 4 at a region for detecting a reference position (or the region for recognizing the direction of the rotation) which edge passes through the neighborhood of the MREs 7 and 8 first. The protrusions 54 and 55 make the restoration of the change in state of the bias magnetic field (or the change in magnetic-vector direction) caused by the trapezoidal tooth 4 faster at a rate approaching that of the change in state of the bias magnetic field (or the change in magnetic-vector direction) caused by the triangular tooth 3. As a result, the disturbance of the change in state of the bias magnetic field (or the change in magnetic-vector direction) during the transition from the triangular tooth 3 to the trapezoidal tooth 4 can be suppressed. Thus, the disturbance of the signal output by the MREs 7 and 8 can also be suppressed as well, making it possible to provide a binary signal with a constant pulse width.

(Third Embodiment)

Next, a third embodiment is explained by focusing on differences from the second embodiment as follows.

Figure 24:
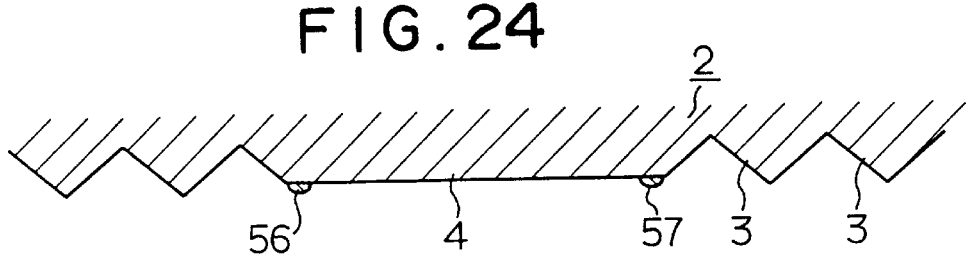
FIG. 24 is an expansion diagram showing a gear employed in a third embodiment implementing a rotation detecting apparatus in accordance with the present invention.

The configuration of the trapezoidal tooth 4 employed in the third embodiment is shown in FIG. 24. In the case of the second embodiment, the protrusions 54 and 55 are formed to provide an integrated single body with the gear 2 as described earlier. In the case of the third embodiment, on the other hand, protrusions 56 and 57 are protruding members made of a magnetic material. In other words, the protrusions 56 and 57 are magnetic parts (each made separately of a material such as a rivet) which parts are fixed on the gear 2 by means of an adhesion or welding technique.

In this way, the shapes and locations of the protrusions can be determined arbitrarily in a later process, resulting in a high degree of freedom in the formation of the protrusions in comparison with a case in which a gear having protrusions is formed by a sintering process.

(Fourth Embodiment)

Next, a fourth embodiment is explained by focusing on differences from the first embodiment as follows.

Figure 25:
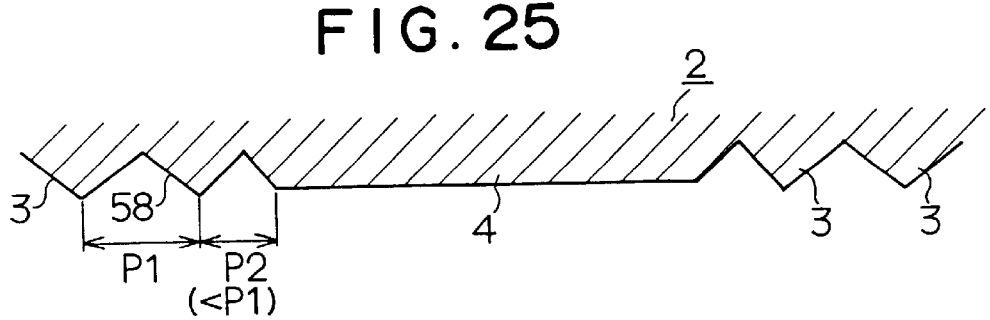
FIG. 25 is an expansion diagram showing a gear employed in a fourth embodiment implementing a rotation detecting apparatus in accordance with the present invention.

As is shown in FIG. 25, a triangular tooth 58 with a pitch P2 smaller than the pitch P1 of other triangular teeth 3 is provided between the trapezoidal tooth 4 and the other triangular teeth 3. The triangular tooth 58 makes the restoration of the change in state of the bias magnetic field (or the change in magnetic-vector direction) caused by the trapezoidal tooth 4 faster at a rate approaching that of the change in state of the bias magnetic field (or the change in magnetic-vector direction) caused by the triangular teeth 3. As a result, the disturbance of the change in state of the bias magnetic field (or the change in magnetic-vector direction) during the transition from the triangular teeth 3 to the trapezoidal tooth 4 can be suppressed. Thus, the disturbance of the signal output by the MREs 7 and 8 can also be suppressed as well, making it possible to provide a binary signal with a constant pulse width.

In this way, in the case of the fourth embodiment, the pulse width of the binary signal can be adjusted similarly to the second and third embodiments without using the protrusions of the second and third embodiments. Thus, the pulse width of the binary signal can be adjusted with a higher degree of accuracy.

In the case of the first embodiment shown in FIG. 4, the gear 2 has a configuration including the trapezoidal and triangular teeth 4 and 3. The configuration of the gear 2 employed in the fourth embodiment shown in FIG. 25 is different from that of the first embodiment in that, in the case of the fourth embodiment, the gear has the trapezoidal teeth 4, the triangular teeth 3 with the pitch P1 and the triangular teeth 58 with the pitch P1 where P1>P2.

In the case of the first embodiment shown in FIG. 4, the period T2 of the pulse signal resulting from the wave shaping process in the detection of a region where the trapezoidal and triangular teeth 4 and 3 are provided at locations adjacent to each other increases to a value greater than T1, the period of the pulse resulting from detection of the triangular tooth 3. In order to solve this problem, the triangular teeth 58 with the pitch P2 are provided in the fourth embodiment shown in FIG. 25. The aim of the reduction of the gap between gear teeth where the period of the pulse increases is to set the period T2 of the pulse of the signal resulting from the wave-shaping process in the detection of a region, where the trapezoidal and triangular teeth 4 and 3 are provided at locations adjacent to each other, at a value close to T1.

(Fifth Embodiment)

Next, a fifth embodiment is explained by focusing on differences from the second and fourth embodiments as follows.

Figure 26:
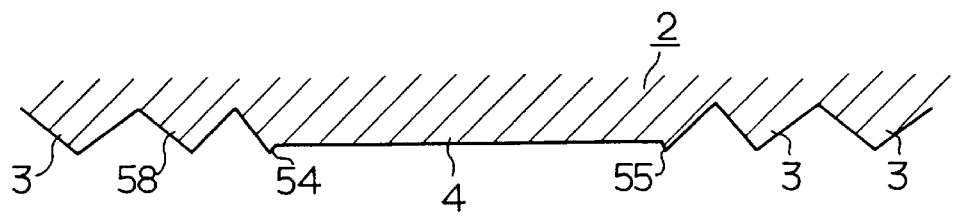
FIG. 26 an expansion diagram showing a gear employed in a fifth embodiment implementing a rotation detecting apparatus in accordance with the present invention.

In the case of the second embodiment, the protrusions 54 and 55 with the predetermined height H3 are provided on the trapezoidal tooth 4 as shown in FIG. 23 and, in the case of the fourth embodiment, a triangular tooth 58 with the pitch P2 smaller than the pitch P1 of triangular tooth 3 is added between the trapezoidal tooth 4 and the triangular tooth 3 as is shown in FIG. 25. In the case of the fifth embodiment, as shown in FIG. 26, the protrusions 54 and 55 with the predetermined height H3 are provided on the trapezoidal tooth 4, and a triangular tooth 58 with the pitch P2 smaller than the pitch P1 of triangular tooth 3 is added between the trapezoidal tooth 4 and the triangular tooth 3.

It is also an object of the fifth embodiment to set the period T2 of the pulse of the signal resulting from the wave shaping process in the detection of a region, where the trapezoidal and triangular teeth 4 and 3 are provided at locations adjacent to each other, at a value close to T1. The technique adopted in the second embodiment to set the pulse period T2 at a value close to T1 by providing the protrusions 54 and 55 on the trapezoidal tooth 4 and the technique adopted in the fourth embodiment to set the pulse period T2 at a value close to T1 by the reduction of the gap between gear teeth where the period of the pulse increases are both embraced simultaneously in the fifth embodiment in an attempt to set the pulse period T2 at a value even closer to T1.

The fifth embodiment is the same as the second embodiment in that protrusions 54 and 55 are provided on each trapezoidal tooth but the former is different from the latter in that, in the case of the former, the gap between gear teeth where the period of the pulse increases is reduced by adding a tooth with the pitch P2 in the gap.

Figure 27:
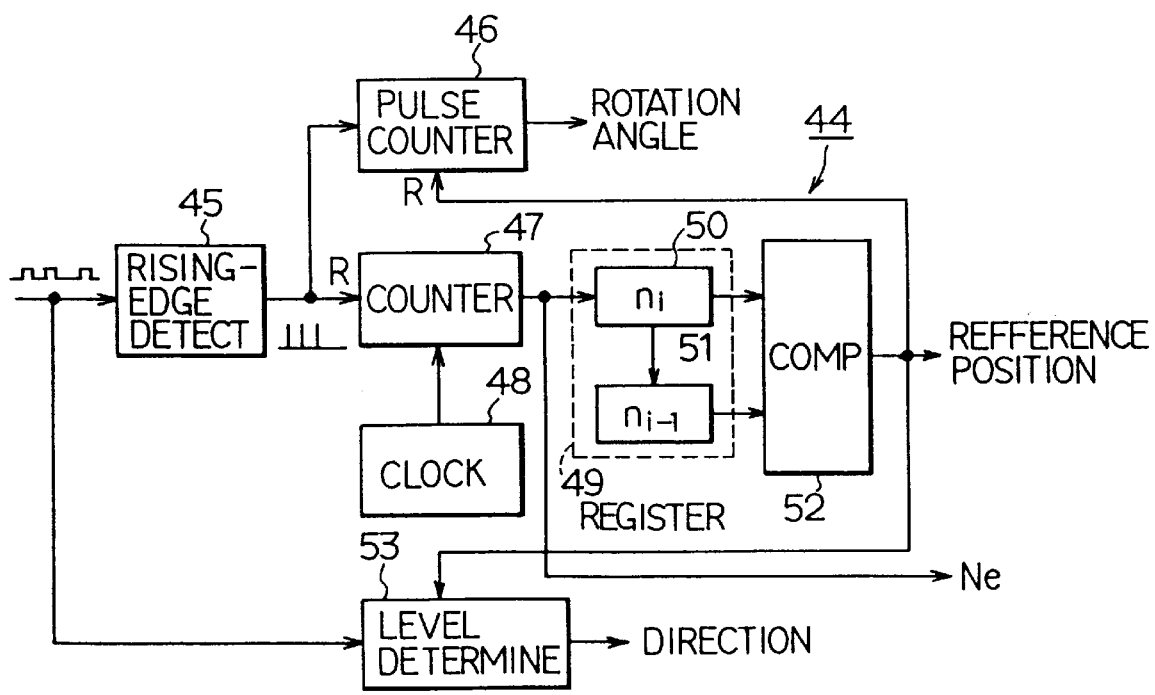
FIG. 27 is a diagram showing the configuration of a processing circuit for comparison purposes.
Figure 28:
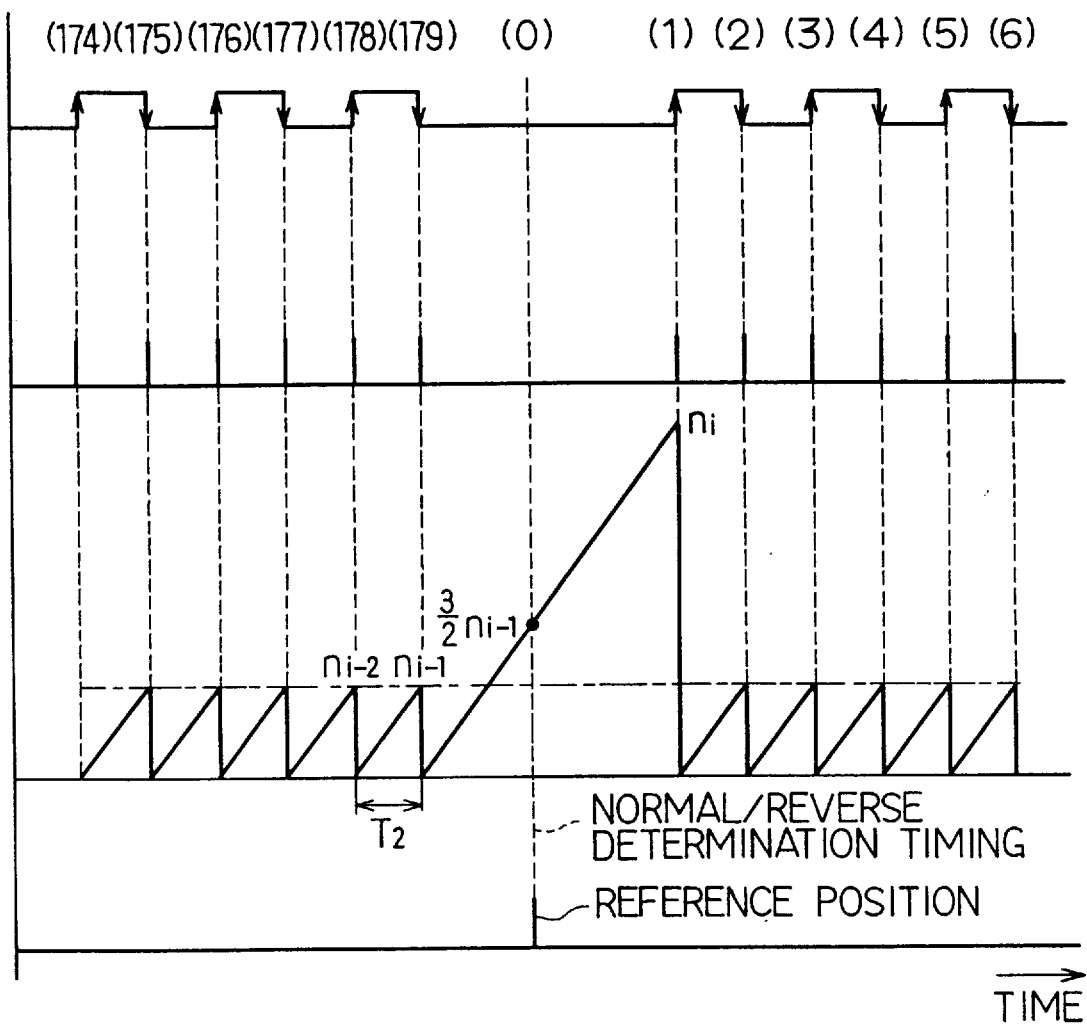
FIG. 28 shows time charts of signal waveforms and others of the rotation detecting apparatus for comparison purposes.

The configuration of the processing circuit 44 which utilizes both rising and falling edges is shown in FIG. 27. In this case, the rising and falling edges of the pulse signal are detected, outputting edge detection signals on the edges as shown in FIG. 28. If the pulse period T2 of the binary signal before a region for determining the direction of the rotation (or the trapezoidal tooth 4) increases, the normal/reverse rotation determination timing lags and, the worst comes to the worst, the normal/reverse rotation determination timing occurs inevitably at a location outside the region for determining the direction of the rotation (or the trapezoidal tooth 4). In the case of the present embodiment, the object of detection is a gear wherein the protrusions 54 and 55 are provided on the trapezoidal tooth 4 at a region for determining the direction of the rotation, and a triangular tooth 58 with the small pitch P2 is added between the trapezoidal tooth 4 at the region for determining the direction of the rotation and the immediately preceding triangular tooth 3, which is separated from an adjacent triangular tooth 3 by a predetermined fixed gap, in an attempt to surely make the period of the pulse before the region for determining the direction of the rotation equal to the period of pulses at other regions.

In the case of a gear which has a diameter of 75 mm, triangular teeth 3 laid out at such equal intervals that 48 teeth can be provided, trapezoidal teeth 4 at regions for recognizing the direction of the rotation and a triangular tooth 58 with a small pitch between each of the trapezoidal teeth 4 and one of the triangular teeth 3 adjacent thereto, and an air gap of 1 mm, the period of the pulse at the region for recognizing the direction of the rotation is about 1.5 times the period of the pulse for the triangular teeth 3 laid out at the equal intervals if no protrusions are provided. By providing the protrusions 54 and 55 with a height equal to 20% of the height of the triangular teeth 3 on each of the trapezoidal teeth 4, the period of the pulse at the region for recognizing the direction of the rotation can be reduced to a value about 1.0 times the period of the pulse for the triangular teeth 3 laid out at the equal intervals.

(Sixth Embodiment)

Next, a sixth embodiment is explained by focusing on differences from the embodiments described so far.

In the case of the embodiments described so far, the operation to detect magnetism is explained by focusing on the triangular teeth 3 provided on the circumference of the gear 2. In the case of the present embodiment, on the other hand, the operation to detect magnetism is explained by focusing on each valley (the object of detection) between two adjacent triangular teeth 3. It can have, however, a configuration similar to those of the embodiments described so far. The present embodiment is explained below because the present embodiment implementing the rotation detecting apparatus or the design concept of the gear 2 may be different in some cases.

Figure 29:
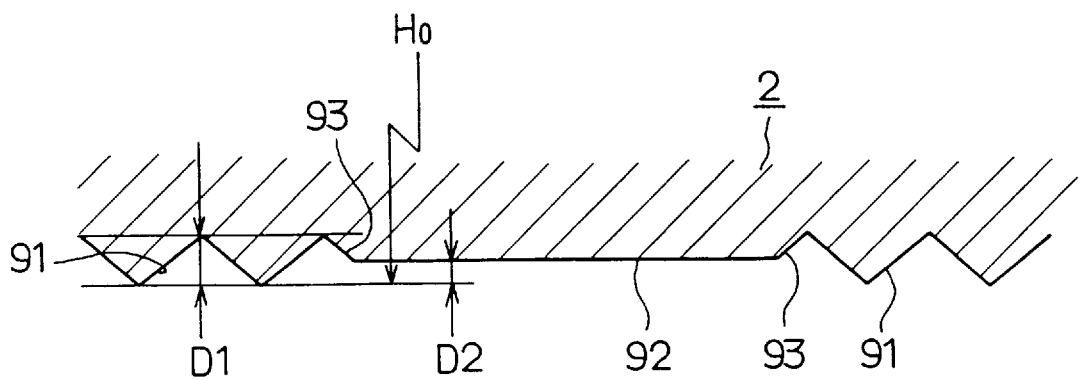
FIG. 29 is an expansion diagram showing a gear employed in a sixth embodiment implementing a rotation detecting apparatus in accordance with the present invention.

FIG. 29 is a diagram showing the cross section of a region for detecting a reference position and regions adjacent thereto of the gear 2. As is shown in the figure, the radius of the outermost circumference of the gear 2 is denoted by H0. A plurality of valleys 91 each with a predetermined depth D1 corresponding to the height H1 are formed with the depth D1 measured from the outermost circumference having the radius H0. At the region for detecting a reference position, a valley 92 is formed, being extended in the circumference direction. In order to distinguish the valley 92 from the valley 91 described above, the valley 92 is referred to hereafter as a missing tooth 92. The depth D2 of the missing tooth 92 is in the range of (0.4 to 0.6)·D1. On both the sides of the missing tooth 92, a groove 93 having a depth D3 equal to the depth D1 of the valleys is formed. It should be noted, however, that the grooves 93 are optional.

Such being the case, by virtue of the missing tooth 92, the restoration of the change in state of the bias magnetic field (or the change in magnetic-vector direction) becomes faster at a rate approaching that of the change in state of the bias magnetic field (or the change in magnetic-vector direction) caused by the valley 91. As a result, the disturbance of the change in state of the bias magnetic field (or the change in magnetic-vector direction) during the transition from the valley 91 to the missing tooth 92 can be suppressed and, thus, the disturbance of the signal output by the MREs 7 and 8 can also be suppressed as well. By providing the groove 93 on both the sides of the missing tooth 92, the restoration of the change in state of the bias magnetic field (or the change in magnetic-vector direction) becomes faster, resulting in a good effect.

(Seventh Embodiment)

Next, a seventh embodiment implementing a cylinder number determining apparatus employed in a multi-cylinder engine is explained. In the case of the seventh embodiment, as many regions for detecting reference positions as the number of cylinders are provided on the circumference of the gear 2. In the regions for detecting reference positions, a plurality of teeth or objects of detection for replacing the teeth are combined to form a variety of distinct patterns. As the cylinder determining unit, a microcomputer 60 is used for carrying out processing to identify a cylinder number. Here, a typical implementation in a four-cylinder engine is explained.

Figure 30:
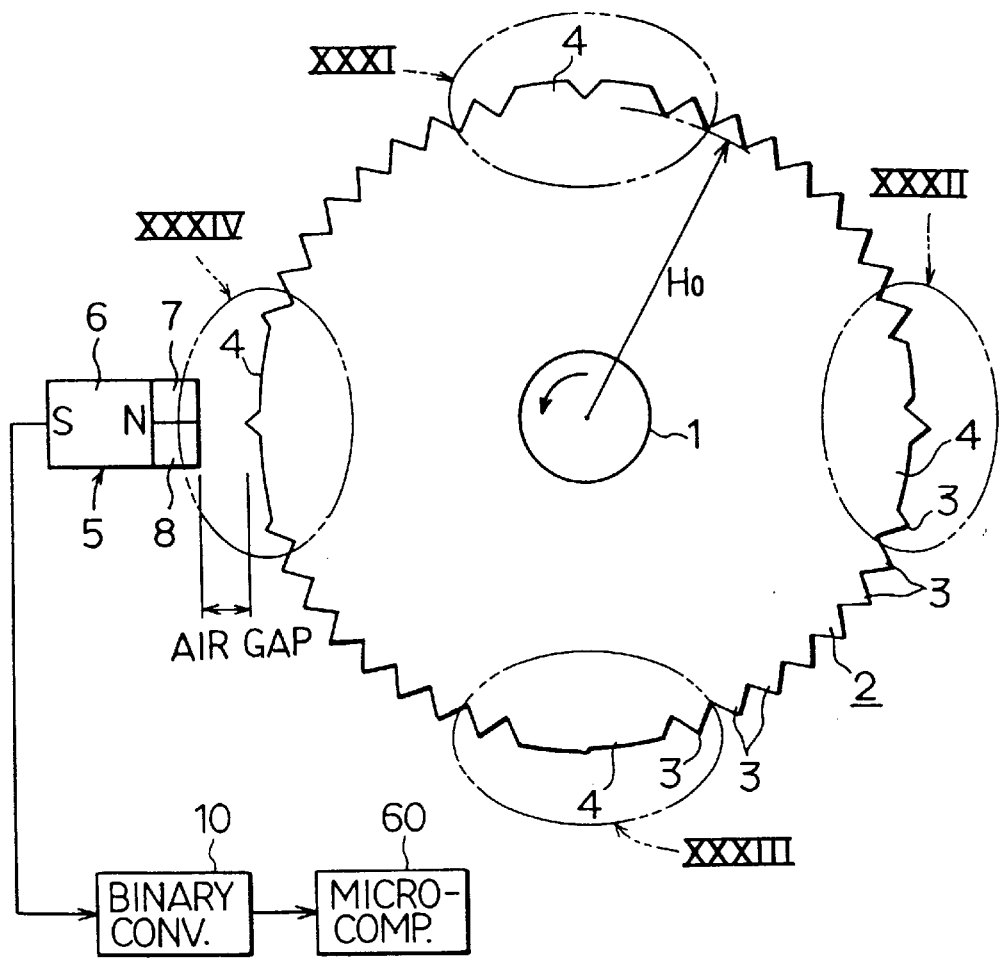
FIG. 30 is a diagram schematically showing a seventh embodiment implementing a rotation detecting apparatus in accordance with the present invention.

As is shown in FIG. 30, the gear 2, the object of detection, is joined to typically a camshaft in order to rotate the gear 2 in the counterclockwise direction in the figure. On the circumference of the gear 2, a plurality of triangular teeth 3 described earlier are formed at equal intervals. The engine rotates by 360° for every two rotations of the crankshaft. Portions XXXI to XXXIV shown in the figure each denote a reference position detection region for detecting a reference position such as a TDC in each of the cylinders of the engine. The reference position detection portions A1 to A4 are laid out on the circumference of the gear 2 at 90-degree intervals or 180-degree CA (crank angle) intervals. For the sake of convenience in the explanation, it is assumed for simplicity that combustion occurs in the engine in a sequence starting with the cylinder #1, followed by the cylinder #2 then the cylinder #3 and ending at the cylinder #4 (#1→#2→#3→#4). In this case, the reference position detection portions XXXI to XXXIV are associated with the cylinders #1, #2, #3 and #4 respectively.

The sensor output, a signal output by the sensor body 5 comprising a p of MREs 7 and 8, is supplied to the binary conversion circuit 10, the same circuit as the one employed in the first embodiment. A binary signal output by the binary conversion circuit 10 is further fed to the microcomputer 60 which comprises logic/processing circuit (CPU) and other generally known memory circuits such as ROM and RAM. Receiving the sensor output, the microcomputer 60 executes processing such as computation of the rotational speed of the engine and identification of one of the cylinders. It should be noted that, in the case of the present embodiment, the microcomputer 60 serves as a cylinder recognizing means.

Features of the shapes of the reference position detection portions XXXI to XXXIV are explained with reference to FIGS. 31 to 34 respectively. First of all, FIG. 31, an enlarged diagram of the portion XXXI, shows a reference-position detection region for the cylinder #1. As is shown in the figure, the region is divided into two equal sub-regions having trapezoidal teeth 61a and 61b formed therein respectively. Much like the embodiments described so far, the following equation holds true:

$$H2=(0.6 \text{ to } 0.9) \cdot H1$$

where H1 is the height of the triangular tooth whereas H2 is the height of the trapezoidal teeth 61a and 61b.

Similarly, FIG. 32, an enlarged diagram of the portion XXXII, shows a reference-position detection region for the cylinder #2. In the region, a trapezoidal tooth 61c with a height H2 having the same value as the height H2 described above is formed between a pair of triangular teeth 3a and 3b and a valley (or a missing tooth) 62a with a predetermined depth is formed between the triangular tooth 3b and a triangular tooth 3c. It should be noted that the missing tooth 62a is a member corresponding to the missing tooth 92 explained and shown earlier in FIG. 29 except that, in this case, the groove 93 is eliminated. As shown in the figure, the missing tooth 62a is formed between a slanting surface of the triangular tooth 3b and a slanting surface of the triangular tooth 3c and the depth D1 thereof is prescribed by the following equation:

$$D1=(0.4 \text{ to } 0.6) \cdot H1$$

Likewise, FIG. 33, an enlarged diagram of the portion XXXIII, shows a reference-position detection region for the cylinder #3. In the region, a missing tooth 62b having the depth D1 is formed, continuing from a slanting surface of a triangular tooth 3d and a trapezoidal tooth 61d having the height H2 is formed immediately after the missing tooth 62b.

Finally, FIG. 34, an enlarged diagram of the portion XXXIV, shows a reference-position detection region for the cylinder #4. In this region, triangular teeth 3e, 3f and 3g and missing teeth 62c and 62d each having the depth D1 are formed alternately.

(Eighth Embodiment)

Next, an eighth embodiment is explained by focusing on differences from the seventh embodiment above as follows. Much like the seventh embodiment, the eighth embodiment has a configuration capable of recognizing any of cylinders employed in a multi-cylinder engine. On the circumference of the gear 2, cylinder detection portions are formed. The cylinder detection portions have shapes which vary from cylinder to cylinder.

Figure 35:
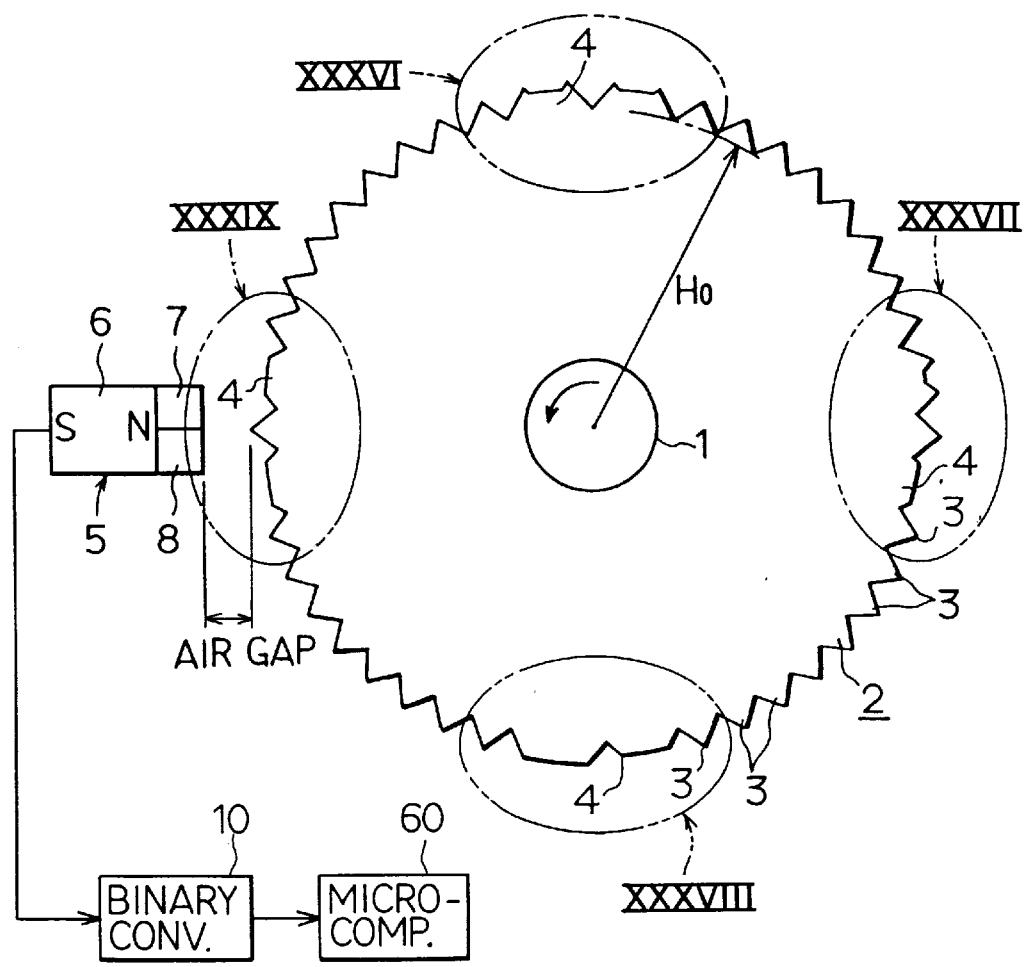
FIG. 35 is a diagram schematically showing an eighth embodiment implementing a rotation detecting apparatus in accordance with the present invention.

As shown in FIG. 35, a plurality of triangular teeth 3 described earlier are formed at equal intervals on the circumference of the gear 2. Portions XXXVI to XXXIX shown in the figure each denote a reference-position detection portion for detecting a reference position such as a TDC in each of the cylinders of the engine. The reference position detection portions XXXVI to XXXIX are laid out on the circumference of the gear 2 at 90-degree intervals. In this case, the reference position detection portions XXXVI to XXXIX are assumed to be associated with the cylinders #1, #2, #3 and #4 respectively.

Features of the shapes of the reference-position detection portions XXXVI to XXXIX are explained by referring to FIGS. 36 to 39 respectively. The portions XXXVI to XXXIX shown in FIG. 35 correspond to the portions XXXI to XXXIX shown in FIG. 30 with the shapes of some teeth in the former different from those in the latter. Differences between FIGS. 36 and 31, FIGS. 37 and 32, FIGS. 38 and 33, and FIGS. 39 and 34 are explained.

Figure 31:
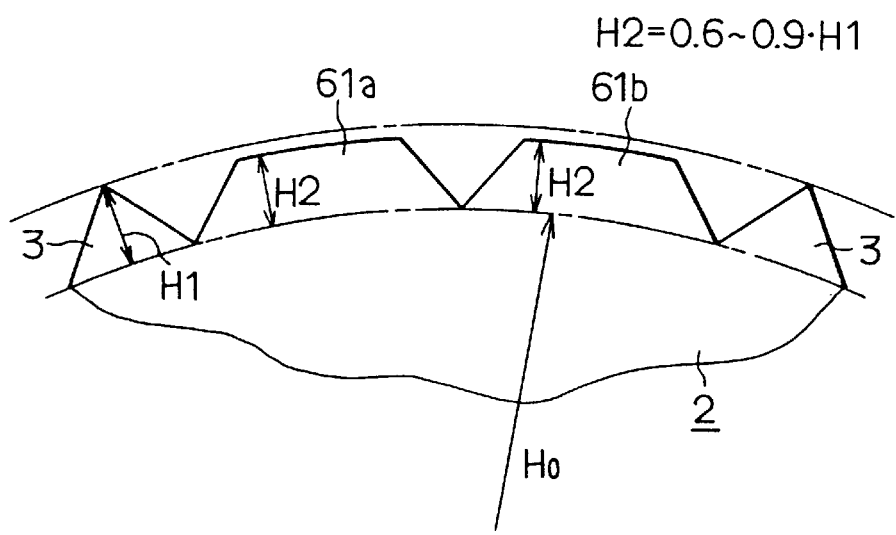
FIG. 31 is an expansion diagram showing a portion XXXI of the gear shown in FIG. 30.
Figure 36:
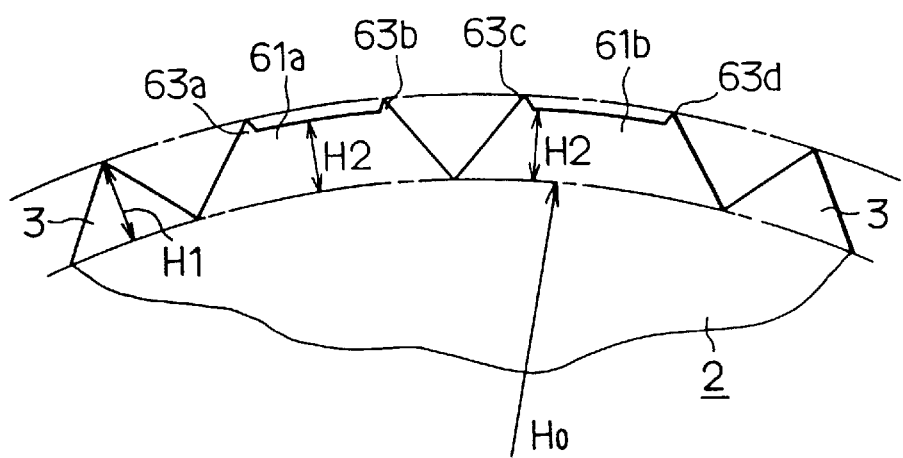
FIG. 36 is an expansion diagram showing a portion XXXVI of the gear shown in FIG. 35.

With respect to differences between FIGS. 36 and 31. FIG. 36 is an enlarged diagram showing the portion XXXVI. As shown in FIG. 36, protrusions 63a and 63b each having a triangular shape are formed at both ends of the upper surface of the trapezoidal 61a. Similarly, protrusions 63c and 63d each having a triangular shape are formed at both ends of the upper surface of the trapezoidal 61b. The height of the vertices of the protrusions 63a to 63d is the same as the height H1 of the triangular tooth 3.

Figure 37:
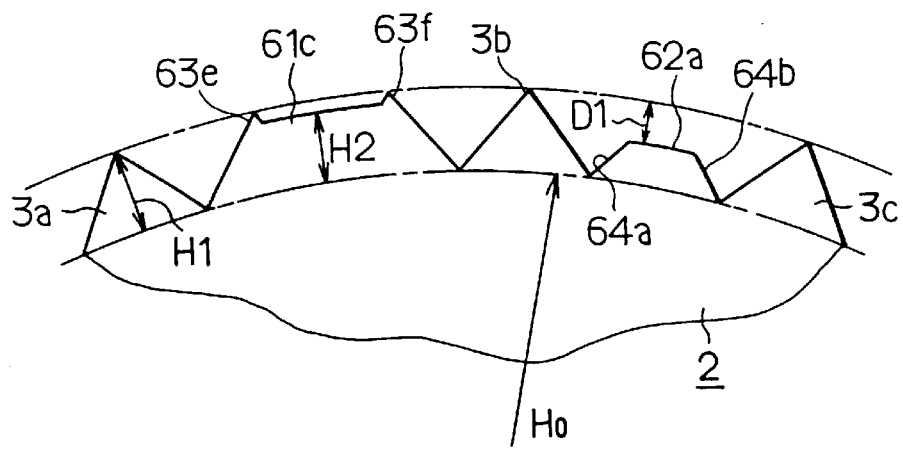
FIG. 37 is an expansion diagram showing a portion XXXVII of the gear shown in FIG. 35.

With respect to differences between FIGS. 37 and 32, FIG. 37 is an enlarged diagram showing the portion XXXVII. As shown in FIG. 37, protrusions 63e and 63f each having a triangular shape are formed at both ends of the upper surface of the trapezoidal 61c. Grooves 64a and 64b each having a shape resembling a triangle turned upside down are formed at both ends of the missing tooth 62a by cutting the edges to the diameter H0 of the circumference of a circle on which the bottom of the tooth 3 is located.

Figure 38:
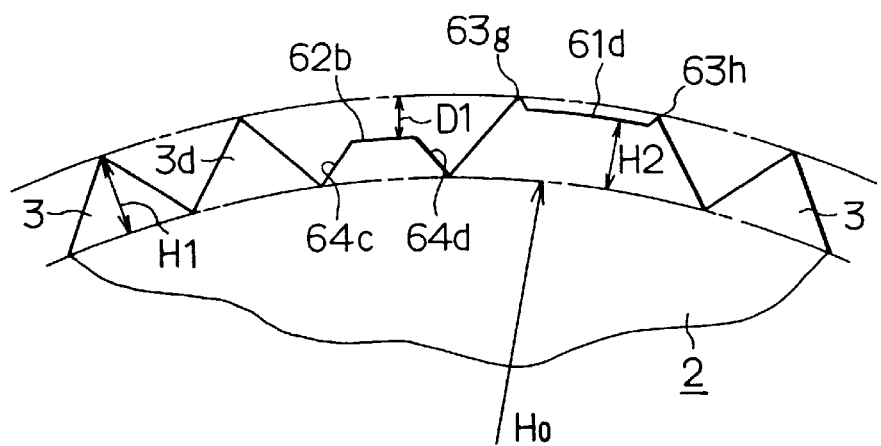
FIG. 38 is an expansion diagram showing a portion XXXVIII of the gear shown in FIG. 35.

With respect to the differences between FIGS. 38 and 33, FIG. 38 is an enlarged diagram showing the portion XXXVIII. As shown in FIG. 38, grooves 64c and 64d are formed at both ends of the missing tooth 62b whereas protrusions 63g and 63h are formed on both ends of the upper surface of the trapezoidal tooth 61d.

Figure 39:
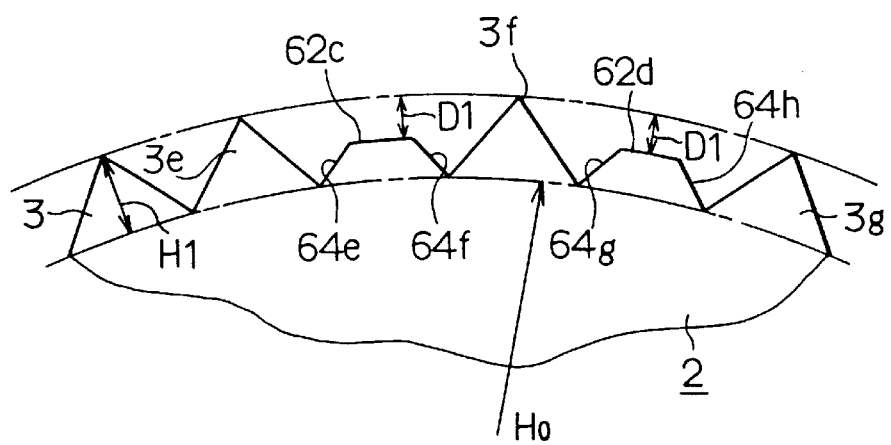
FIG. 39 is an expansion diagram showing a portion XXXIX of the gear shown in FIG. 35.

Finally, with respect to the differences between FIGS. 39 and 34, FIG. 39 is an enlarged diagram showing the portion XXXIX. As shown in FIG. 39, grooves 64e and 64f are formed at both ends of the missing tooth 62c whereas grooves 64g and 64h are formed on both ends of the missing tooth 62d.

(Ninth Embodiment)

Next, a ninth embodiment implementing an apparatus for detecting a reference crank position of an engine in accordance with the present invention is explained as follows.

With this embodiment, one reference crank position is detected for every two rotations of the engine or one rotation of the gear 2. It should be noted that, in the case of the present embodiment, the gear 2 rotates in the clockwise direction in the figure.

Figure 40:
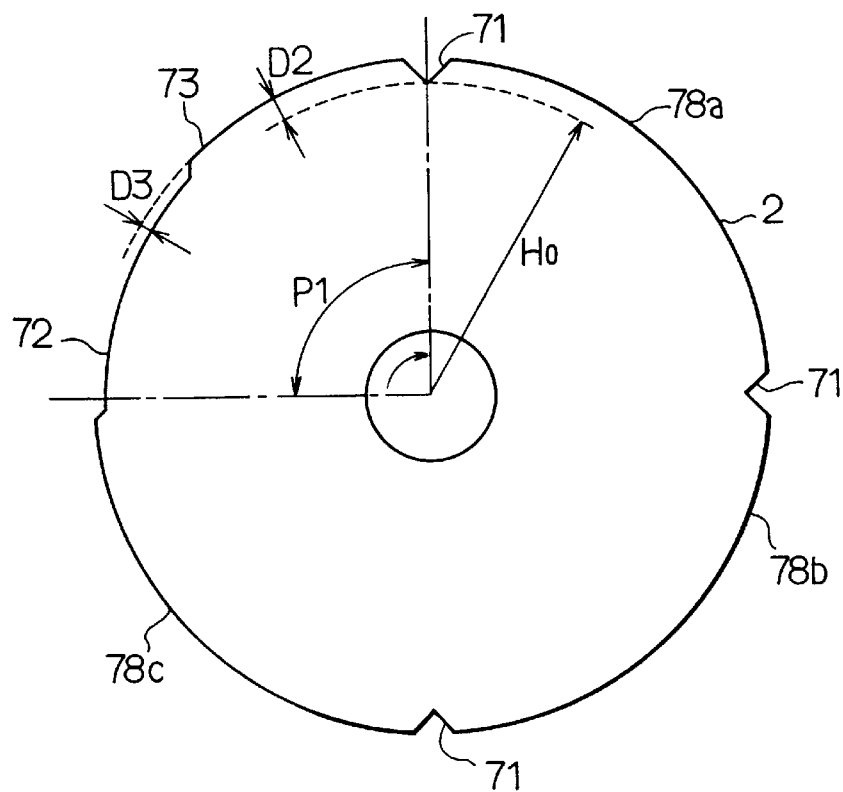
FIG. 40 is a diagram schematically showing an ninth embodiment implementing a rotation detecting apparatus in accordance with the present invention.

A whole state of the gear 2 is shown in FIG. 40. As shown in the figure, cut portions 71 are formed on the circumference of the gear 2 at 90-degree intervals or 180-degree intervals. The cut portion 72 has a depth D2. Reference numerals 78a to 78c denote uniform objects of detection which are formed on the circumference of the gear 2. A portion P1 shown in the figure is a region for detecting a reference position. On the portion P1, a missing tooth 72 and a trapezoidal tooth 73 are formed, being extended in the circumference direction of the gear 2.

(Tenth Embodiment)

Next, a tenth embodiment which is obtained by modifying portions of the ninth embodiment is explained as follows. The state of a gear employed in the tenth embodiment is shown in FIG. 41.

Figure 41:
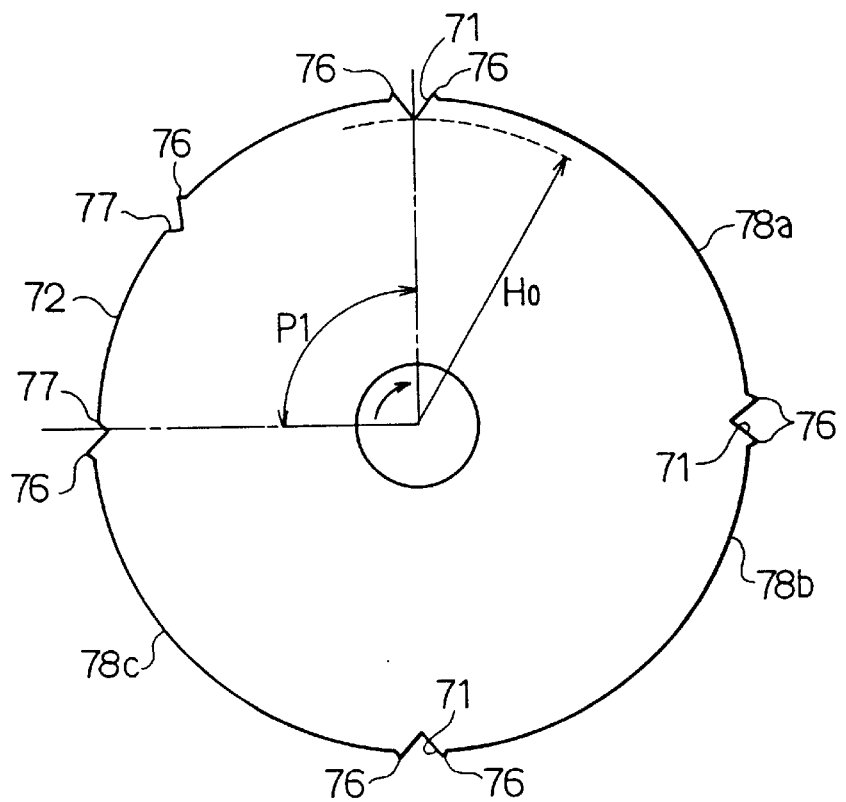
FIG. 41 is a diagram schematically showing a tenth embodiment implementing a rotation detecting apparatus in accordance with the present invention.

Differences between the tenth embodiment shown in FIG. 41 and the ninth embodiment shown in FIG. 40 reside in that protrusions 76 are formed on both mouth ends of the cut portion 71 of the tenth embodiment. At both ends of the missing tooth 72 of the reference-position detection region (or the portion P1 shown in the figure), grooves 77 are formed and, on both ends of the upper surface of the trapezoidal tooth 73, protrusions 76 are formed.

(Eleventh Embodiment)

Next, an eleventh embodiment implementing an apparatus for detecting a reference crank position in accordance with the present invention is explained as follows.

Figure 42:
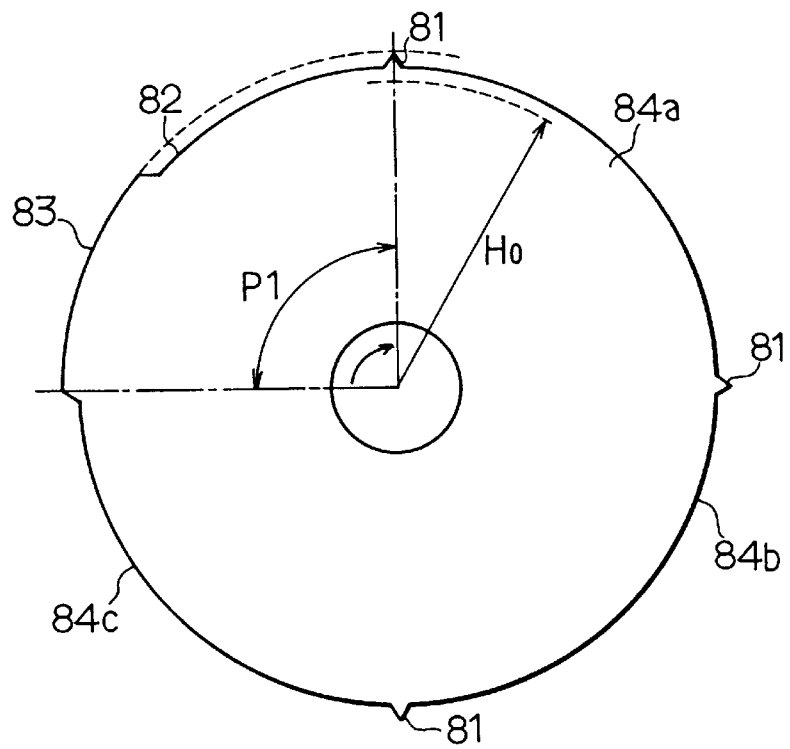
FIG. 42 is a diagram showing the shape of a gear and a signal waveform of the eleventh embodiment.

A whole state of the gear 2 is shown in FIG. 42. As shown in the figure, protrusions 81 are formed on the circumference of the gear 2 at 90-degree intervals or 180-degree intervals. Reference numerals 84a to 84c denote uniform objects of detection which are formed on the circumference of the gear 2. The bottom surface of the objects of detection 84a to 84c has a diameter larger than the diameter H0 of the tooth-bottom circle H0 shown in FIG. 1. On a portion P1 which serves as a region for detecting a reference position, a missing tooth 82 and a trapezoidal tooth 83 are formed, being extended in the circumference direction of the gear 2.

(Twelfth Embodiment)

Next, a twelfth embodiment which is obtained by modifying portions of the eleventh embodiment is explained as follows. The state of a gear employed in the eleventh embodiment is shown in FIG. 43.

Figure 43:
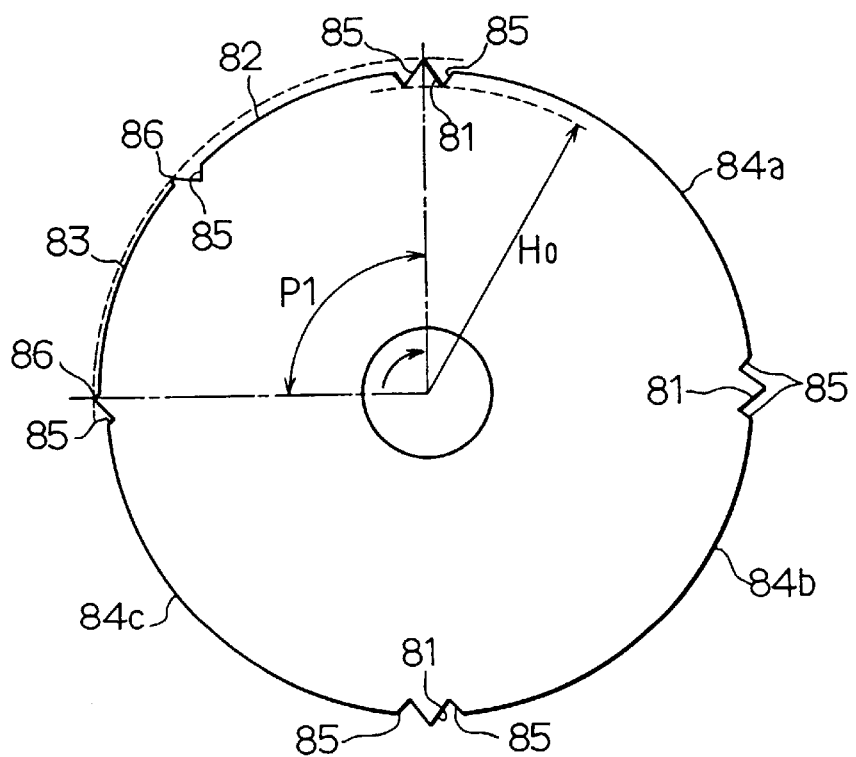
FIG. 43 is a diagram showing the shape of a gear employed in an twelfth embodiment.

Differences between the twelfth embodiment shown in FIG. 43 and the eleventh embodiment shown in FIG. 42 include the fact that a groove 85 is formed at the bottom of the protrusion 81 of the twelfth embodiment. At both ends of the missing tooth 82 of the reference-position detection region (or the portion P1 shown in the figure), grooves 85 are formed and, on both ends of the upper surface of the trapezoidal tooth 83, protrusions 86 are formed.

Other embodiments provided by the present invention are explained as follows.

A Hall device can also be used in place of the ferroelectric magneto-resistive element (MRE).

In respect to the comparison of the ferroelectric magneto-resistive element (MRE) with the Hall device, the Hall device has a structure with 4 terminals. On the other hand, the ferroelectric magneto-resistive element (MRE) has a structure with only two terminals, a structure simpler than that of the Hall device. By employing a ferroelectric magneto-resistive element (MRE), the sensitivity can be made higher than that of a Hall device, allowing the number of gear teeth, objects of detection, to be increased in order to generate a large number of pulses. With a ferroelectric magneto-resistive element (MRE), the gap can be set at a large value, making it possible to use not only a bias magnet of the rare-earth family, but also a bias magnet of the ferrite family.

A semiconductor magneto-resistive device can also be used in place of the ferroelectric magneto-resistive element (MRE).

The region for creating the trapezoidal tooth 4 (or the region for recognizing the direction of the rotation) in the embodiments described above can be used as a missing tooth. In this scheme, a missing tooth is detected for every two rotations of the gear 2 and the direction of the rotation is determined from the level of the signal output by the half-bridge circuit at that time.

The shape of the gear teeth can be rectangular or trapezoidal instead of the triangular form.

The binary-conversion technique used for the circuit can be based on a hysteresis loop having two threshold values VTH1 and VTH2.

As described above, the embodiments implement a rotation detecting apparatus. It should be noted, however, that the embodiments can also implement a linear sensor as well. That is to say, the scope of present invention also includes the detection of movement in a straight direction including reciprocal movement in addition to the detection of rotary movement. The present invention can also be applied to a variety of equipment such as a rotation detecting apparatus employed in a motor in addition to the apparatus for detecting the rotation of an engine.

As described above, the embodiments described above are used for detecting a reference position as well as the direction of a rotation. It should be noted, however, that an embodiment for recognizing the direction of a rotation only without detecting a reference position or an embodiment for detecting a reference position only without recognizing the direction of a rotation can also be provided as well. It is also worth noting that, in the case of an embodiment for detecting a reference position only without recognizing the direction of a rotation, it is not always necessary to design a bridge circuit by using a plurality of magneto-electric conversion devices.

Also as described above, a half-bridge circuit comprising the MREs 7 and 8 is employed in each of the embodiments described above. It should be noted, however, that a bridge circuit comprising the MREs 7 and 8 and two constant-resistance resistors can be employed in place of the half-bridge circuit. A bridge circuit comprising three or more MREs provided at locations separated from each other in the direction of object movement can also be employed as well. To sum up, the direction of movement can be recognized by means of a bridge circuit with a configuration comprising at least two MREs.

In the case of the seventh embodiment, four different reference position detection regions for recognizing cylinders of a four-cylinder engine are provided as described earlier. It should be noted, however, that this configuration may be changed. For example, an embodiment can be provided for recognizing cylinders of a six-cylinder engine or an eight-cylinder engine. In this case, the combustion cylinder can also be recognized for every other cylinder.

As described above, the present invention has an excellent effect in the prevention of an increase in the amplitude of a signal generated on the border between a region having teeth with a uniform shape and another region.

What is claimed is:

1. A magnetic detection apparatus comprising:

a bias magnet for generating a bias magnetic field directed toward an object of detection made of a magnetic material, a magnetized surface of said bias magnet facing a plurality of teeth formed on said object;

a magneto-electric conversion device for converting variations in a state of said bias magnetic field generated by said bias magnet in a direction toward said object into an output electrical signal varying in response to movement of said object;

amplification means for amplifying said electrical signal output of said magneto-electric conversion device with a predetermined maximum output value as a limit;

binary conversion means for converting an amplified signal output of said amplification means into a binary signal; and movement detecting means for detecting a passage of said teeth in a region predetermined to be at least one of a reference position detection region and a movement direction determination region by receiving said binary signal of said binary conversion means, wherein said teeth include:

a plurality of uniform teeth provided on said object at equal angular intervals;

a tooth provided in said region of said object and having a height smaller than that of said uniform teeth but greater than half that of said uniform teeth, said height being measured in a direction toward said magneto-electric conversion means, and wherein said binary conversion means includes:

peak hold means for holding a peak value of said amplified signal output;

bottom hold means for holding a bottom value of said amplified signal output;

threshold means for setting a threshold value from said peak value and said bottom value; and comparison means for comparing said amplified signal output with said threshold value and outputting said binary signal in accordance with a comparison result.

2. A magnetic detection apparatus according to claim 1, wherein:

said threshold value includes a plurality of threshold values which are different from each other.

3. A magnetic detection apparatus according to claim 1, wherein:

a protrusion is formed to extend at least one end of said tooth provided in said region in a direction approaching said magneto-electric conversion device, said one end approaching said magneto-electric conversion device earlier than another end of said tooth in said region in response to movement of said object.

4. A magnetic detection apparatus according to claim 3, wherein:

said protrusion is a protrusively formed member which is made of a magnetic material and fixed on said one end of said tooth.

5. A magnetic detection apparatus according to claim 1, wherein:

one of said uniform teeth provided adjacent to said tooth in said region has a pitch smaller than that of said uniform teeth.

6. A magnetic detection apparatus according to claim 1, wherein:

said uniform teeth are each formed in a triangular shape and said tooth is formed in a trapezoidal shape.

7. A magnetic detection apparatus according to claim 1, wherein:

said reference position detection region is the same as said movement direction determination region;

said magneto-electric conversion device includes a first magneto-electric conversion means and a second magneto-electric conversion means for converting variations in state of said bias magnetic field generated by said bias magnet toward said object;

said second magneto-electric conversion means is provided at a location separated by a predetermined distance from said first magneto-electric conversion means in a direction of movement of said object in said bias magnetic field and forms a bridge circuit in conjunction with said first magneto-electric conversion means to produce said electrical output signal; and said movement detecting means includes movement direction detecting means for receiving said binary signal output of said binary conversion means for use in detecting a passage of said movement direction determination region and determining the direction of said movement in accordance with a signal level of said signal output.

8. A magnetic detection apparatus according to claim 1, wherein:

said object is a rotary body for transmitting a rotational movement of a crankshaft employed in a multi-cylinder engine and said reference-position detection regions are provided in such a way that said rotary body is associated with a predetermined cylinder employed in said multi-cylinder engine.

9. A magnetic detection apparatus according to claim 8, wherein:

said reference position detection region are provided for each of said cylinders employed in said multi-cylinder engine on a one-to-one basis; and cylinder recognizing means are provided for identifying a cylinder number from a detection result obtained for said tooth provided in said region.

10. A magnetic detection apparatus comprising:

a bias magnet for generating a bias magnetic field directed toward an object of detection made of a magnetic material, a magnetized surface of said bias magnet facing a plurality of teeth formed on said object;

a magneto-resistive conversion device disposed in said bias magnetic field for converting a state of said bias magnetic field from said bias magnet toward said object into an output electrical signal varying in response to movement of said object;

binary conversion means for converting said electrical signal output of said magneto-resistive conversion device into a binary signal; and reference position detecting means for detecting a passage of said teeth and a reference position provided in a reference detection region by receiving said binary signal output of said binary conversion means, wherein said teeth include:

a plurality of uniform teeth provided on said object in a movement direction except for said reference detection region; and a tooth different from said uniform teeth and provided in said reference detection region in said movement direction, wherein said tooth has a width larger than that of each of said uniform teeth and is constructed to cause an amplitude of said electrical signal output corresponding thereto to be substantially equal to said electrical signal output corresponding to said uniform teeth.

11. A magnetic detection apparatus according to claim 10, wherein:

said tooth provided in said reference detection region has a height different from that of said uniform teeth, the height being measured in a direction approaching said magneto-resistive conversion means.

12. A magnetic detection apparatus according to claim 10, wherein:

said tooth provided in said reference detection region has a height smaller than that of said uniform teeth.

13. A magnetic detection apparatus according to claim 12, wherein:

said height of said tooth provided in said reference detection region is greater than half that of said uniform teeth.

14. A magnetic detection apparatus according to claim 10, wherein:

a protrusion is formed to extend at least one end of said tooth in said region toward said magneto-resistive conversion device, said one end approaching said magneto-resistive conversion device earlier than another end of said tooth in said region in response to movement of said object.

15. A magnetic detection apparatus according to claim 14, wherein:

said protrusion is a protrusively formed member which is made of a magnetic material and fixed on said end of said tooth.

16. A magnetic detection apparatus according to claim 10, wherein:

a pitch between said tooth in said region and one of said uniform teeth provided adjacent to said tooth in said region is smaller than that between two of said uniform teeth.

17. A magnetic detection apparatus according to claim 10, wherein:

said uniform teeth are each formed in a triangular shape and define between an adjacent two thereof a valley having a depth; and said tooth in said region is formed in a trapezoidal shape having a concave surface of a depth smaller than said depth of said valley.

18. A magnetic detection apparatus comprising:

a bias magnet for generating a bias magnetic field directed toward an object of detection made of a magnetic material, a magnetized surface of said bias magnet facing a plurality of teeth formed on said object;

a magneto-resistive conversion device disposed in said bias magnetic field for converting a state of said bias magnetic field from said bias magnet toward said object into an output electrical signal varying in response to movement of said object;

binary conversion means for converting said electrical signal output of said magneto-resistive conversion device into a binary signal; and reference position detecting means for detecting a passage of said teeth provided in a region predetermined to be at least one of a reference position detection region and a movement direction determination region by receiving said binary signal output of said binary conversion means, wherein said teeth include:

a plurality of uniform teeth provided on said object in a movement direction except for said region; and a tooth different from said uniform teeth and provided in said region in said movement direction, wherein said tooth has a height smaller than that of said uniform teeth, and said height of said tooth is greater than half that of said uniform teeth.

19. A magnetic detection apparatus comprising:

a detection object made of a magnetic material and having a reference tooth at a reference position and a plurality of uniform teeth at positions other than said reference position;

a bias magnet for generating a bias magnetic field directed toward said detection object so that said bias magnetic field is changed by said reference tooth and said uniform teeth of said object in response to a relative movement between said detection object and said bias magnet; and a magnetic field responsive device disposed in said magnetic field and producing an electric signal corresponding to changes in said magnetic field, wherein said reference tooth has a width wider than that of each of said uniform teeth in a direction of said relative movement and a height which is between a height of said uniform teeth and one half the height of said uniform teeth in a direction toward said bias magnet, so that an amplitude of said electrical signal corresponding to said changes caused by said reference tooth and said uniform teeth is equalized.

20. A magnetic detection apparatus according to claim 19, wherein:

said reference tooth is in a trapezoidal shape and each of said uniform teeth has a triangular shape, and a ratio of the height of said trapezoidal shape is between 60% and 70% of the height of said uniform teeth.

* * * * *